United States Patent
Ihara et al.

(10) Patent No.: US 6,389,182 B1
(45) Date of Patent: May 14, 2002

(54) IMAGE PROCESSING APPARATUS, IMAGE PROCESSING METHOD AND STORAGE MEDIUM

(75) Inventors: Keigo Ihara, Chiba; Junichi Rekimoto; Takahiko Sueyoshi, both of Tokyo; Toru Konishi, Kanagawa, all of (JP)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 09/340,974

(22) Filed: Jun. 28, 1999

(30) Foreign Application Priority Data

Jun. 30, 1998 (JP) ............................................ 10-184351

(51) Int. Cl.⁷ .......................... G06K 9/00; G06K 9/03; G06K 9/34; G03B 7/08; G06F 15/00
(52) U.S. Cl. ........................ 382/309; 382/139; 382/151; 382/175; 382/182; 382/306; 382/317; 235/462.24; 235/487; 235/494; 345/629; 700/500.1
(58) Field of Search ............................ 382/175, 151, 382/181, 190, 139, 309, 312, 317, 103, 306, 311, 182, 183, 185, 291; 235/462.2, 462.25, 462.24, 487, 494; 345/629, 634, 636; 700/500.1

(56) References Cited

U.S. PATENT DOCUMENTS

| | | | | |
|---|---|---|---|---|
| 5,038,392 A | * | 8/1991 | Morris et al. | 382/175 |
| 5,805,152 A | * | 9/1998 | Furusawa | 345/302 |
| 6,000,614 A | * | 12/1999 | Yang et al. | 235/460 |
| 6,061,502 A | * | 5/2000 | Ho et al. | 358/1.15 |

* cited by examiner

Primary Examiner—Leo Boudreau
Assistant Examiner—Daniel G. Mariam
(74) Attorney, Agent, or Firm—Frommer Lawrence & Haug LLP; William S. Frommer; Darren M. Simon

(57) ABSTRACT

An image processing apparatus including: an image acquiring element for acquiring a target image; an identification information recognizing element for recognizing identification information corresponding to a specific image pattern from the target image acquired by the image acquiring element; and an activating element for activating selectively from among a plurality of previously stored processes a specific process corresponding to the identification information recognized by the identification information recognizing element so as to start execution of the specific process.

10 Claims, 27 Drawing Sheets

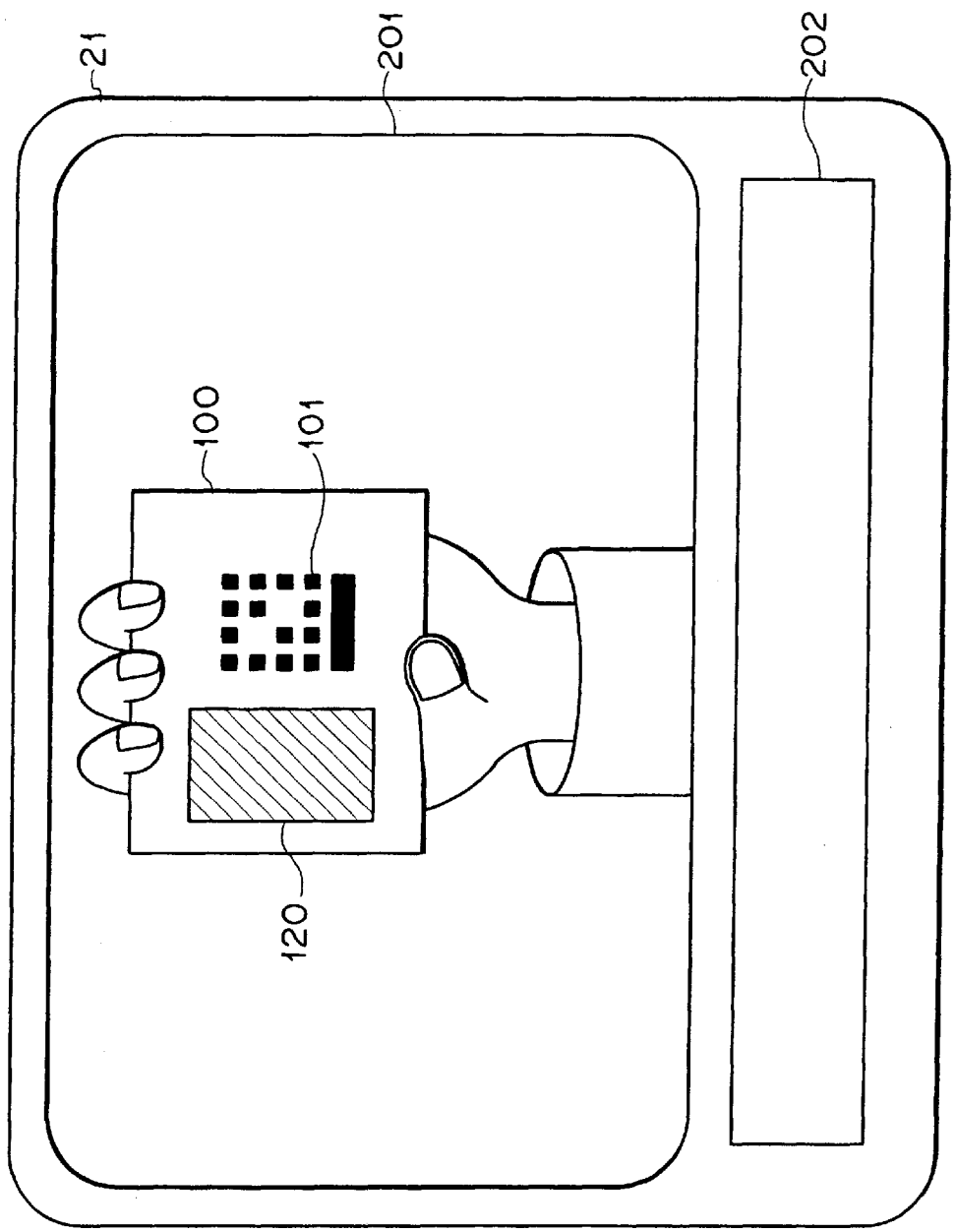

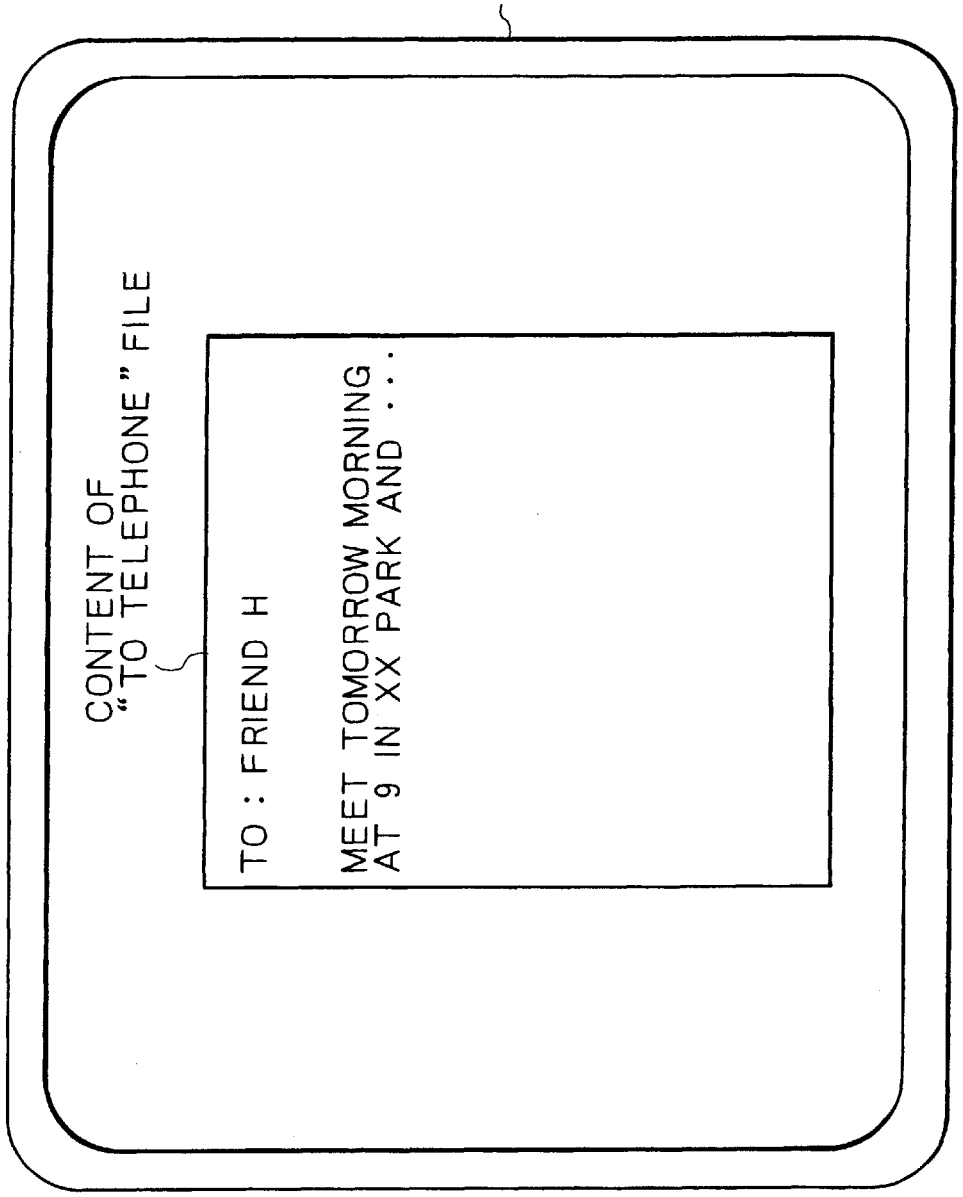

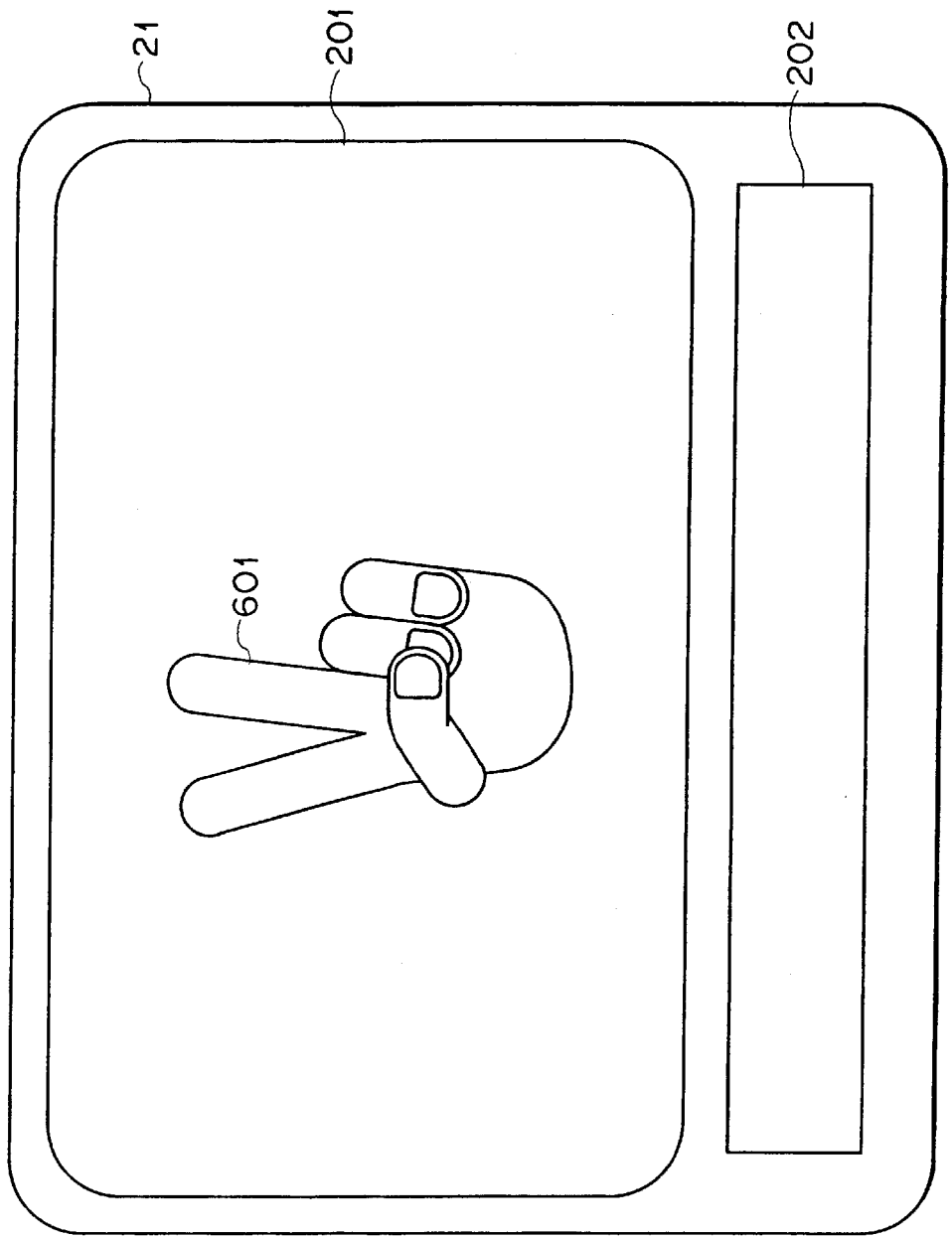

IMAGE PROCESSING APPARATUS, IMAGE PROCESSING METHOD AND STORAGE MEDIUM

BACKGROUND OF THE INVENTION

The present invention relates to an image processing apparatus, an image processing method, and a storage medium for allowing an image processing program to be executed by a computer. More particularly, the invention relates to an image processing apparatus, an image processing method, and a storage medium for allowing an image processing program to be executed by a computer, the apparatus and the method permitting acquisition of identification information from a two-dimensional code and position information about the two-dimensional code, the acquired information being used as a basis for carrying out various processes.

Recent years have witnessed widespread use of personal computer operating systems such as Windows 95 and Windows 98 (registered trademarks), both from Microsoft Corporation in the United States. Such operating systems offer on a display screen a task bar with indications visible to users such as buttons representing applications each having an active window. A technique dealing with the use of the task bar is disclosed in detail by Japanese Patent Laid-open No. Hei 8-255066.

Below is an excerpt from the cited patent application. The task bar is a visible user interface element that informs a user which tasks are currently active. The task bar also serves as a point for displaying currently active task windows. The task bar includes a start menu button including menu items that allow the user to activate desired programs, open documents and control system settings.

In a typical computer system including a central processing unit (CPU) and such peripherals as a mouse, a keyboard and a video display, the start menu button on the task bar is operated illustratively as follows: the start menu button is operated by the user to open the start menu serving as a centralized location for gaining access to programs, documents, system controls and help information. Initially, the user points a mouse cursor to the start menu button and clicks on a left mouse button. The actions cause the start menu to appear.

The start menu typically includes such menu items as programs, search, setting and help. The "programs" menu item permits access to a program menu hierarchically displayed from the start menu become accessible. The program menu displays a plurality of application programs and a group of programs that may be selected by the user.

The user is required repeatedly to perform complicated actions when selecting and activating a desired application program from the task bar including the start menu button. Specifically, the user first points the mouse cursor to the start menu button on the task bar and clicks on the left mouse button to display the start menu. Next, the user points the mouse cursor to the "programs" menu item in the start menu and clicks on the left mouse button to display the program menu. The user then points the mouse cursor to an indication of the desired application program in the program menu, and clicks on the left mouse button. Another series of point and click actions is needed if there is an application program group. Finally the CPU activates the selected application program.

The user is required conventionally to repeat such complicated actions before starting the desired application program. If the user is already handling some other chores with one hand, operating the above pointing device with the other hand often turns out to be a difficult task from a user interface point of view. The same difficulty is encountered when other menu items such as "help" are clicked on from the start menu program for desired processing.

Meanwhile, the so-called bar code system is used extensively in various industrial fields. The system involves encoding in bars alphanumeric characters representing identification numbers and other information about goods and articles, and attaching such codes to the goods and products so that their identification information may later be scanned and retrieved by an optical recognition apparatus called a bar code scanner.

At cash registers or like equipment installed in retail stores, bar codes on sold products are optically scanned so as to acquire their identification numbers. The acquired identification numbers are used as a basis for retrieving previously stored prices of the corresponding products from a database, and the retrieved prices are displayed at the cashiers' counter.

The conventional bar code has been utilized as a means for alleviating the burden of cashiers entering product identification numbers. However, the code system has not been used for bypassing the chores of input operations such as menu selections when a desired program is activated selectively from among application programs stored beforehand on a hard disk drive (HDD) of a general purpose personal computer.

SUMMARY OF THE INVENTION

It is an object of the present invention to provide an image processing apparatus, an image processing method, and a storage medium for allowing an image processing program to be executed by a computer, wherein a target image when simply captured prompts automatic execution of a desired process corresponding to the image.

In carrying out the invention and according to one aspect thereof, there is provided an image processing apparatus including: image acquiring means for acquiring a target image; identification information recognizing means for recognizing identification information corresponding to a specific image pattern from the target image acquired by the image acquiring means; and activating means for activating selectively from among a plurality of previously stored processes a specific process corresponding to the identification information recognized by the identification information recognizing means so as to start execution of the specific process.

According to another aspect of the invention, there is provided an image processing method including the steps of: acquiring a target image; recognizing identification information corresponding to a specific image pattern from the target image acquired by the image acquiring means; and activating selectively from among a plurality of previously stored processes a specific process corresponding to the identification information recognized in the identification information recognizing step so as to start execution of the specific process.

According to a further aspect of the invention, there is provided a storage medium for storing an image processing program executable by a computer and including the steps of: acquiring a target image; recognizing identification information corresponding to a specific image pattern from the target image acquired by the image acquiring means; and activating selectively from among a plurality of previously stored processes a specific process corresponding to the identification information recognized in the identification information recognizing step so as to start execution of the specific process.

Through the use of the inventive image processing apparatus, image processing method and storage medium outlined above, identification information is first recognized from an acquired target image. A specific process corresponding to the acquired identification information is then activated selectively from among a plurality of previously stored processes.

Other objects, features and advantages of the invention will become more apparent upon a reading of the following description and appended drawings.

BRIEF DESCRIPTION OF THE DRAWINGS

FIG. 12 is a schematic view sketching a typical display on an LCD in FIG. 3;

FIG. 28 is a schematic view of another display on the LCD in FIG. 3;

FIG. 31 is a schematic view of another display on the LCD in FIG. 3.

DESCRIPTION OF THE PREFERRED EMBODIMENTS

Preferred embodiments of this invention will now be described with reference to the accompanying drawings.

Figure 1:
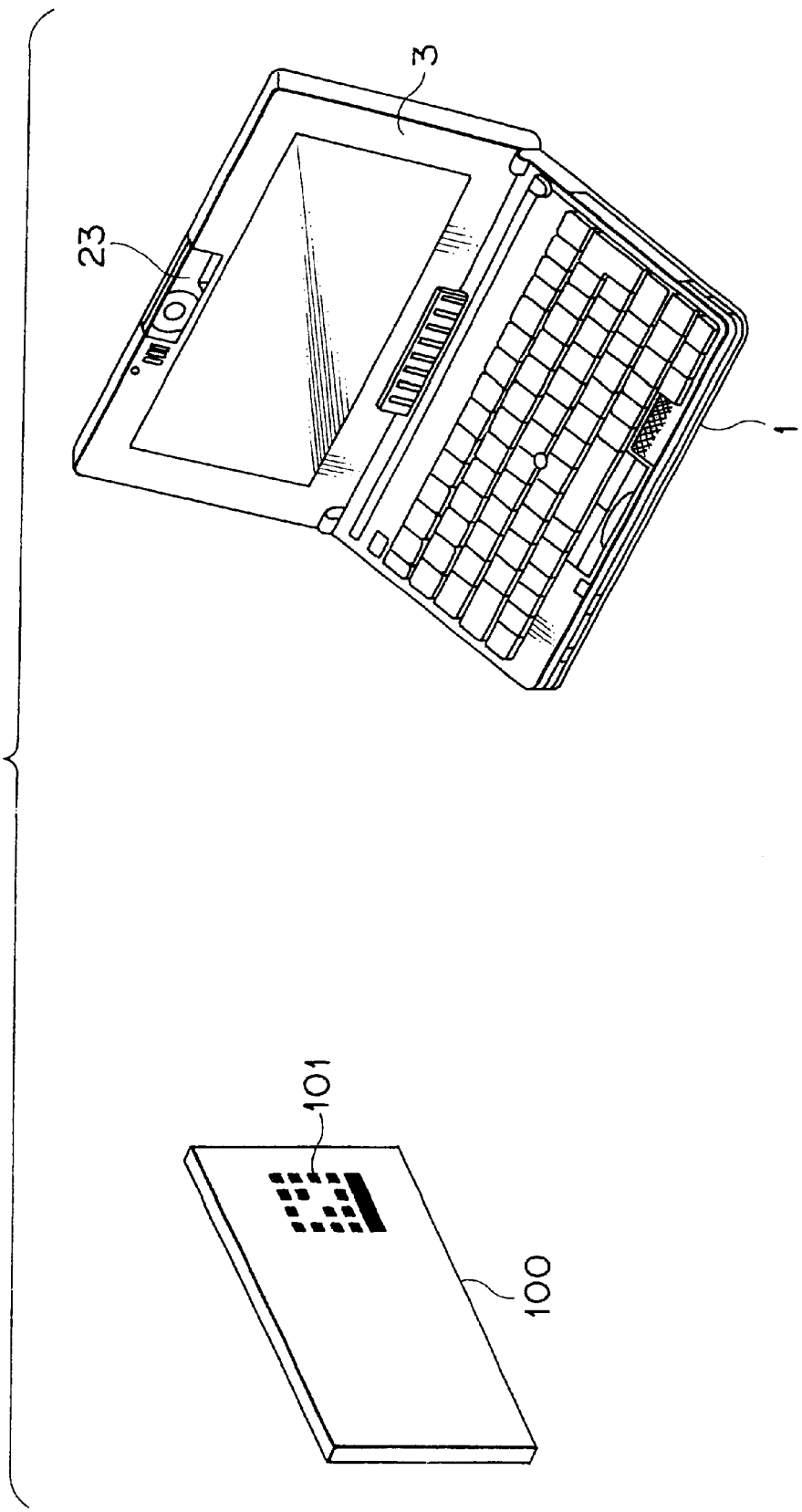
FIG. 1 is a schematic view of a personal computer to which the invention is applied.
Figure 2:
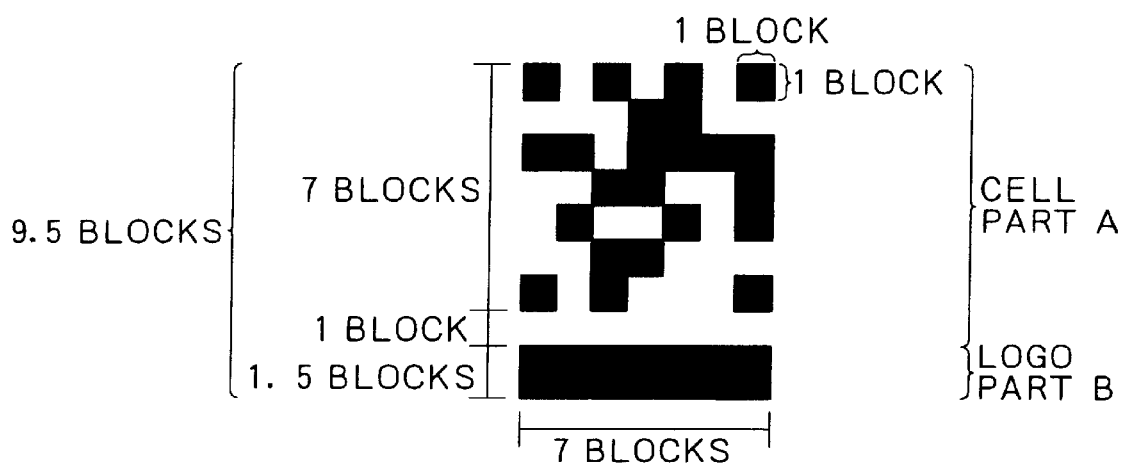
FIG. 2 is an explanatory view depicting specifications of a two-dimensional code.

FIG. 1 is a schematic view of a personal computer 1 to which the invention is applied. In this example, an object 100 is a business card. A two-dimensional code 101 is printed directly onto the right-hand side of the object 100, or a label on which the two-dimensional code 101 is printed is attached to the right-hand side of the object 100. The two-dimensional code 101 may be referred to as the 2D code hereunder where appropriate. As shown in FIG. 2, the two-dimensional code 101 constitutes a block unit-based rectangle measuring 9.5 blocks by 7 blocks. The rectangle comprises a cell part A and a logo part B in black separated by a block. The cell part A forms a square of 7 blocks per side comprising square cells arranged in a two-dimensional pattern. The logo part B includes a large-sized rectangle measuring 1.5 blocks by 7 blocks. The logo part B also has a logo mark such as "CyberCode (registered trademark) printed as blanks representing a code system name of the two-dimensional code 101.

Illustratively, the following description is available at the time of submitting this application from the home page offered by this applicant at (URL):

http://www.sony.co jp/sd/ProductsPark/Consumer/ PCOM/PCG-C1CAT/cybercode.html

"What we call "CyberCode" is Sony's unique two-dimensional code system that offers about 16.77 million different patterns (in 24 bits). Of these patterns, about one million patterns (in 20 bits) may be registered as desired for program start-up purposes. The remaining code patterns are reserved for future service expansion.

"CyberCode" works as an index to what is represented by the code in question, the index allowing relevant information to be retrieved from computer storage. When a user starts a program through a new interface feature "Cyber-Code Finder," the user finds that the corresponding information leaps from the object having the "CyberCode" onto the computer screen."

The personal computer 1 is a notebook type computer comprising a CCD video camera 23 located in a display part 3. Illustratively, the personal computer 1 recognizes a pattern of the 2D code 101 on the basis of image data about the object 100 and 2D code 101, the image data being acquired by the CCD video camera 23. The personal computer 1 performs a process in accordance with the pattern of the 2D code 101 thus obtained.

Figure 3:
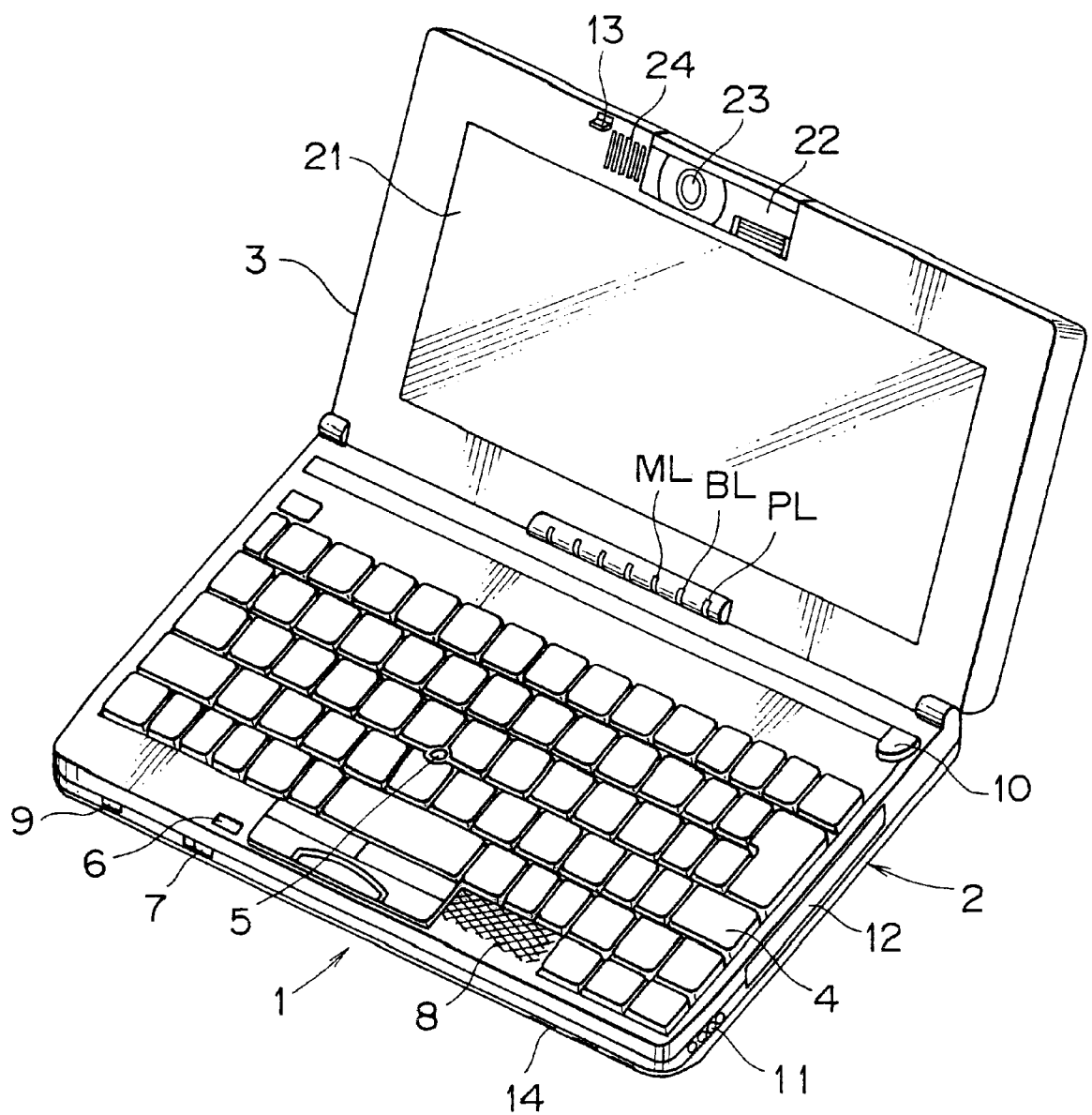
FIG. 3 is a perspective view of a portable personal computer embodying the invention, with its display part swung open away from its body.
Figure 4:
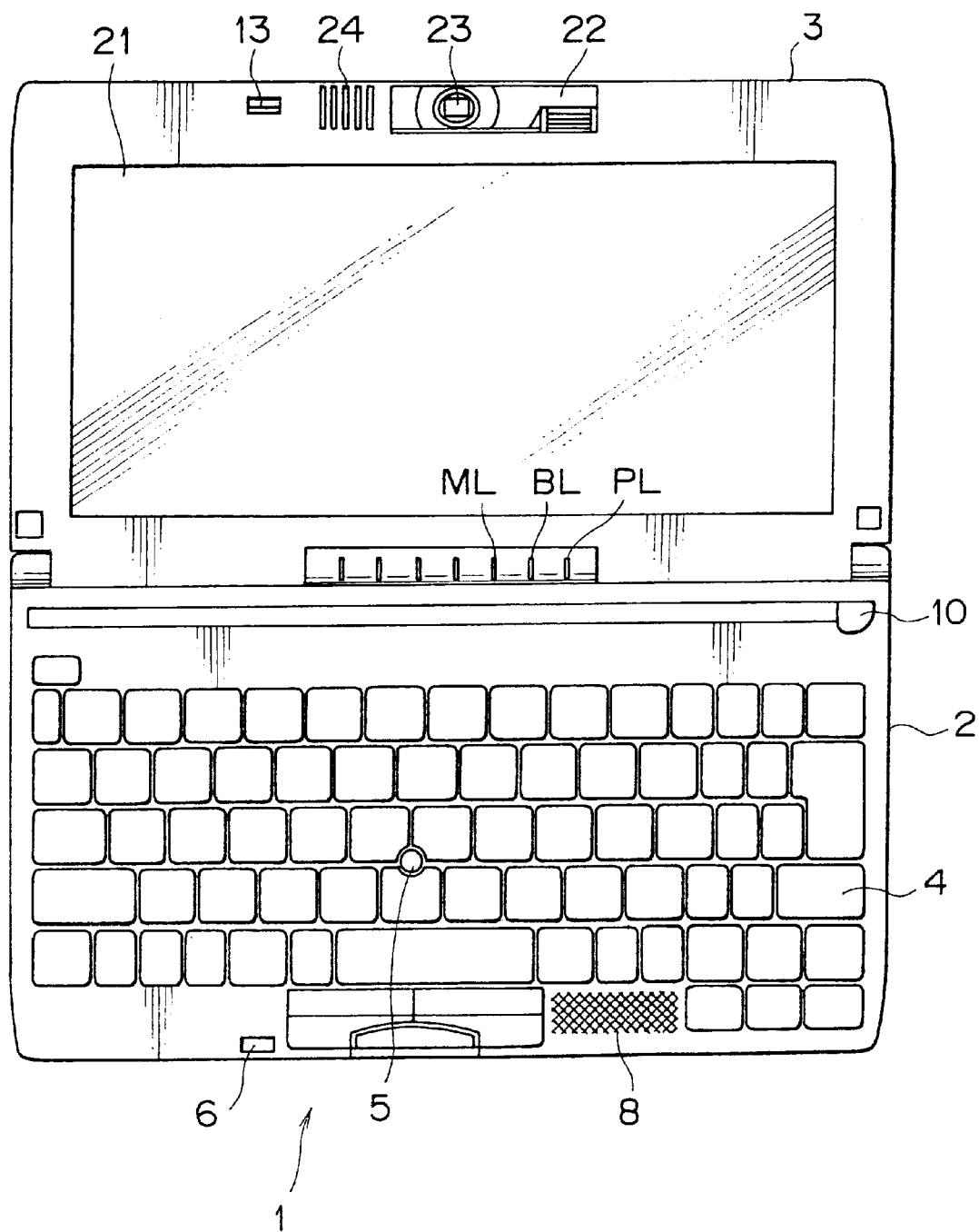
FIG. 4 is a plan view of the computer in FIG. 1.
Figure 5:
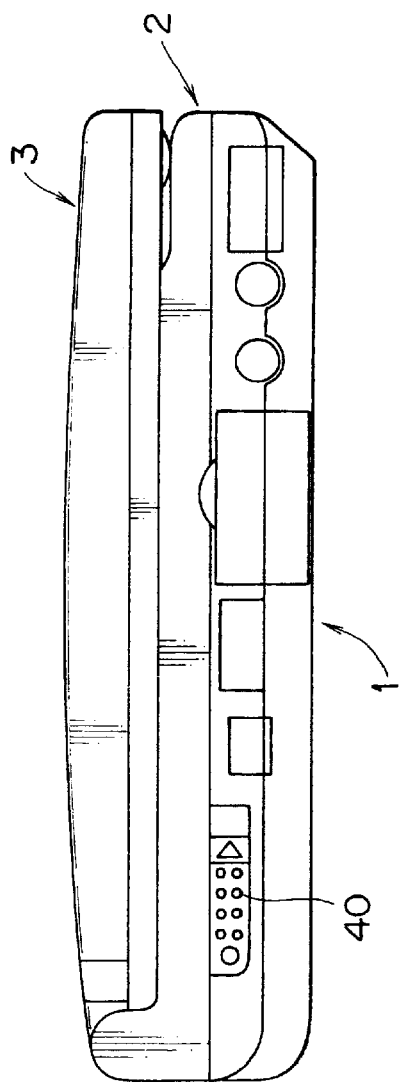
FIG. 5 is a left-hand side view of the computer in FIG. 1 with its display part swung shut onto its body.
Figure 6:
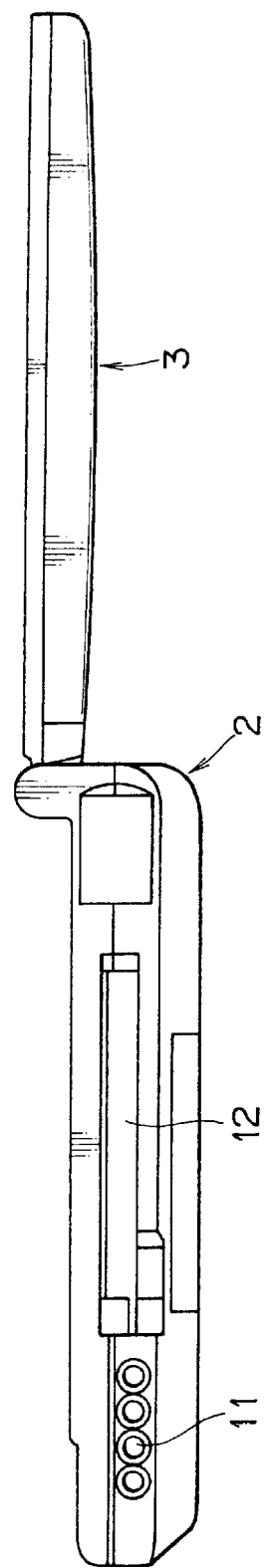
FIG. 6 is a right-hand side view of the computer in FIG. 1 with its display part swung open 180 degrees relative to its body.
Figure 7:
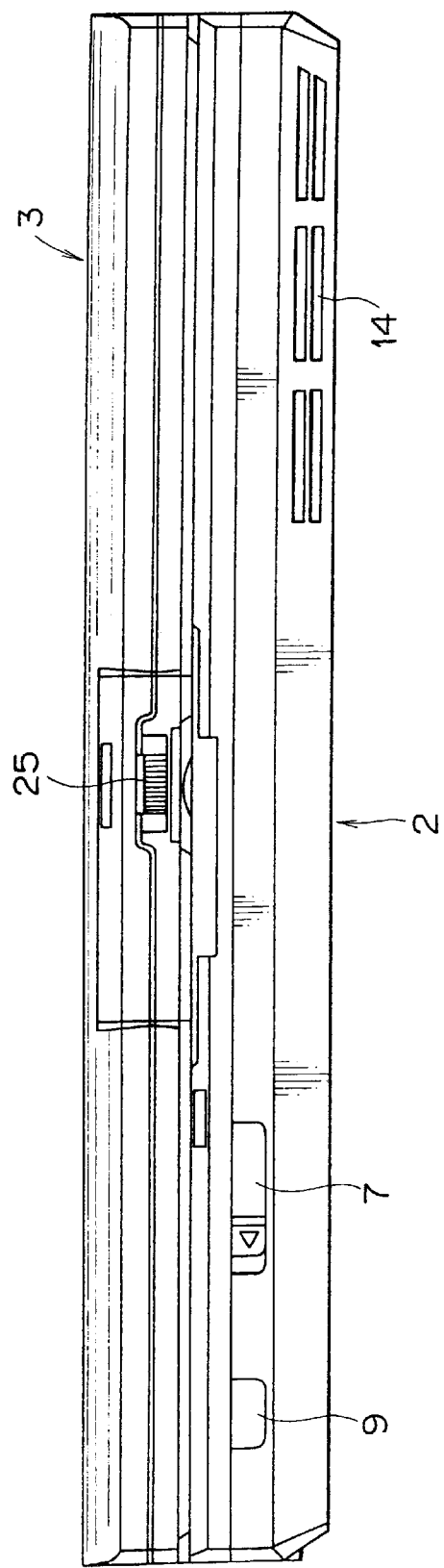
FIG. 7 is a front view of the computer in FIG. 3.
Figure 8:
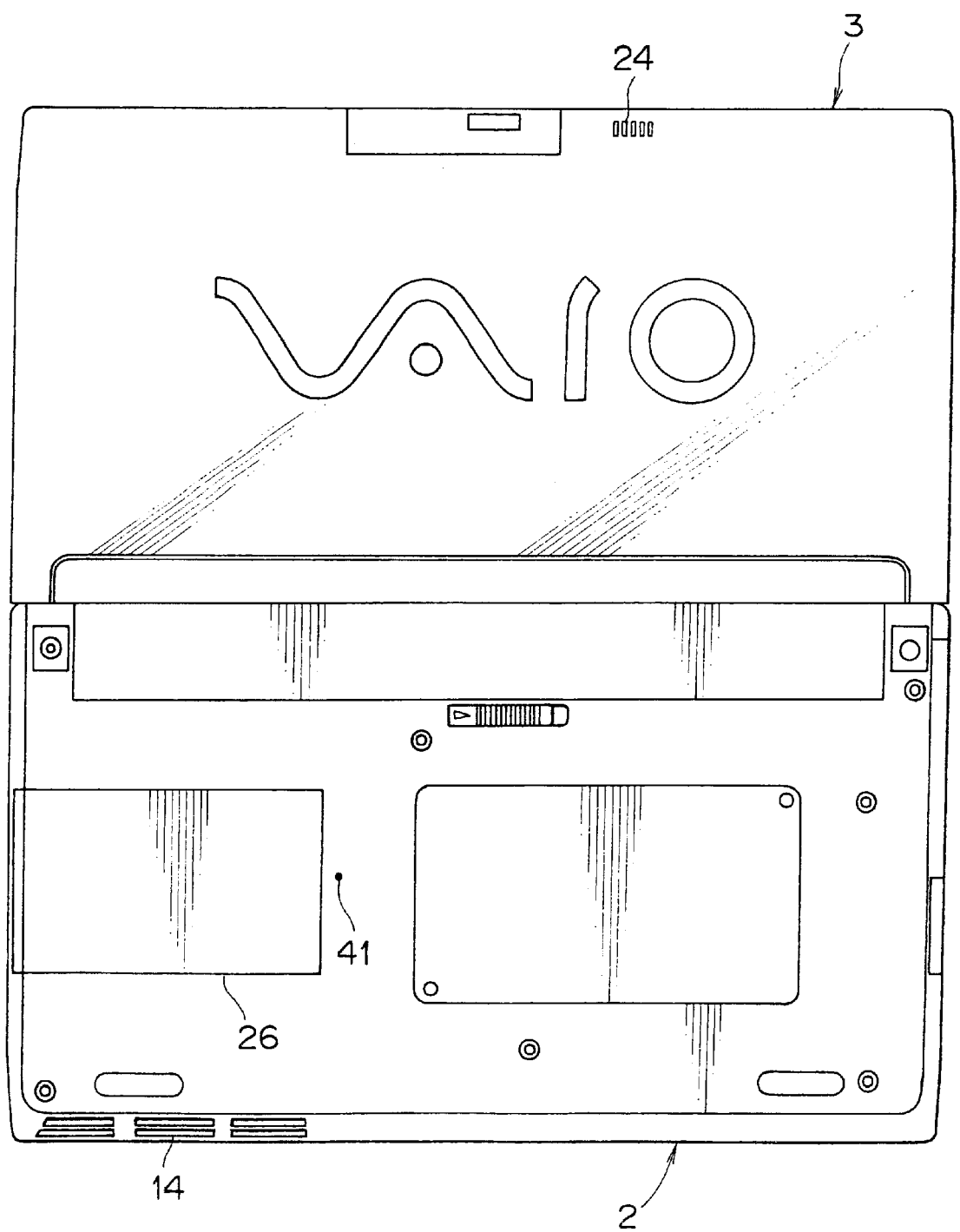
FIG. 8 is a bottom view of the computer in FIG. 4.

FIGS. 3 through 8 depict a typical portable personal computer to which the invention is applied. The personal computer 1 is a mini-notebook type personal computer that primarily comprises a body 2 and a display part 3 attached swingingly to the body 2. FIG. 3 is a perspective view of the computer with the display part 3 swung open away from the body 2. FIG. 4 is a plan view of the computer in FIG. 3. FIG. 5 is a left-hand side view of the computer with the display part 3 swung shut onto the body 2. FIG. 6 is a right-hand side view of the computer with the display part 3 swung open 180 degrees relative to the body 2. FIG. 7 is a front view of the computer in FIG. 5. FIG. 8 is a bottom view of the computer in FIG. 6.

The face of the body 2 comprises a keyboard 4 and a stick type pointing device 5. The keyboard 4 is used to input characters, symbols, etc., and the stick type pointing device 5 is operated to move a mouse cursor. Also furnished on the body face is a speaker 8 outputting sound and a shutter button 10 operated to take a picture using the CCD video camera 23 mounted on the display part 3.

A pawl 13 is provided at the upper end of the display part 3. As shown in FIG. 5, with the display part 3 swung closed onto the body 2, the pawl 13 hooks onto a hole 6 in the body 2. At the front of the body 2 is a slide lever 7 furnished in a crosswise movable fashion. The slide lever 7 is used to lock and unlock the pawl 13 so that the pawl 13 is engaged with and disengaged from the hole 6. With the pawl 13 unlocked, the display part 3 may be swung open away from the body 2. Adjacent to the pawl 13 is a microphone 24 which, as depicted in FIG. 8, may pick up sound from both the front and the back side of the body 2.

The front of the body 2 further comprises a programmable power key (PPK) 9. An air outlet 11 is provided on the right-hand side of the body 2, as shown in FIG. 6. At the lower end in front of the body 2 is an air inlet 14 as depicted in FIG. 7. To the right of the air outlet 11 is a slot 12 that accommodates a PCMCIA (Personal Computer Memory Card International Association) card (called a PC card).

An LCD (liquid crystal display) 21 for displaying images is provided on the front of the display part 3. At the upper end of the LCD 21 is an image pickup part 22 mounted rotatably on the display part 3. More specifically, the image pickup part 22 is rotatable to any position within a range of 180 degrees in the same direction as the LCD 21 and in the opposite direction thereof (i.e., toward the back). The image pickup part 22 is furnished with the CCD video camera 23.

At the lower end of the display part 3 on the body side is a group of lamps including a power lamp PL, a battery lamp BL, a message lamp ML and other LEDs. Reference numeral 40 in FIG. 5 denotes a power switch furnished on the left-hand side of the body 2, and reference numeral 25 in FIG. 7 represents an adjusting ring used to adjust the focus of the CCD video camera 23. Reference numeral 26 in FIG. 8 stands for a cover that conceals an opening through which to install an additional memory into the body 2, and reference numeral 41 denotes a hole through which to insert a pin to unlock the cover 26.

Figure 9:
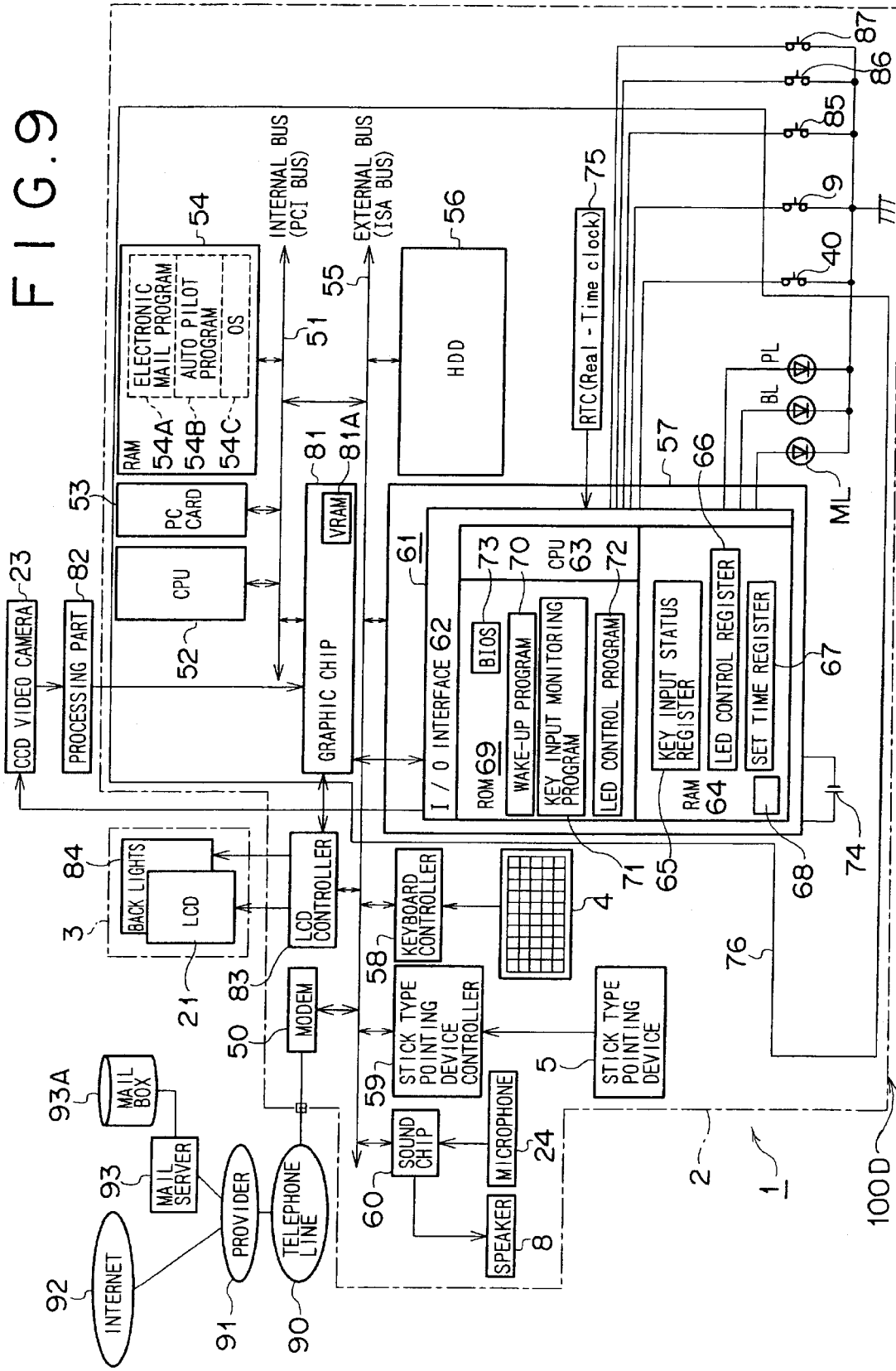
FIG. 9 is a block diagram showing an internal structure of the personal computer in FIG. 1.

FIG. 9 illustrates an internal structure of the personal computer 1. An internal bus 51 is connected to a CPU (central processing unit) 52, a PC card 53 inserted as needed, a RAM (random access memory) 54, and a graphic chip 81. The internal bus is coupled to an external bus 55. The external bus 55, for its part, is connected to a hard disk drive (HDD) 56, an I/O (input/output) controller 57, a keyboard controller 58, a stick type pointing device controller 59, a sound chip 60, an LCD controller 83, and a modem 50.

The CPU 52 is a controller that controls diverse computer functions. The PC card 53 is installed as needed when an optional function is to be added.

Image data captured by the CCD video camera 23 are forwarded to a processing part 82 for processing. The image data processed by the processing part 82 are input to the graphic chip 81. The graphic chip 81 stores the input video data into an internal VRAM 81A, and retrieves the data from the memory as needed for output to the LCD controller 83. Given the image data from the graphic chip 81, the LCD controller 83 outputs the data to the LCD 21 for display. Back lights 84 are provided to illuminate the LCD 21 from the back.

When the personal computer 1 is booted up, an electronic mail program (an application program) 54A, an auto pilot program (another application program) 54B and the OS (operating program) 54C are transferred from the HDD 56 to the RAM 54 and retained therein.

The electronic mail program 54A is a program that exchanges communication messages with an external entity using a communication line such as a telephone line and by way of a network. A received mail acquisition function is specifically included in the electronic mail program 54A. The received mail acquisition function checks a mail server 93 to see if a mail box 93A therein contains any mail addressed to this program (i.e., to the user). If any such mail is found in the mail box, the received mail acquisition function carries out a suitable process to acquire that mail.

The auto pilot program 54B is a program that starts up and carries out a plurality of predetermined processes (or programs) in a predetermined sequence.

The OS (operating system) 54C controls basic computer functions. Typical operating systems are Windows 95, Windows 98 (registered trademarks), and the like.

Figure 10:
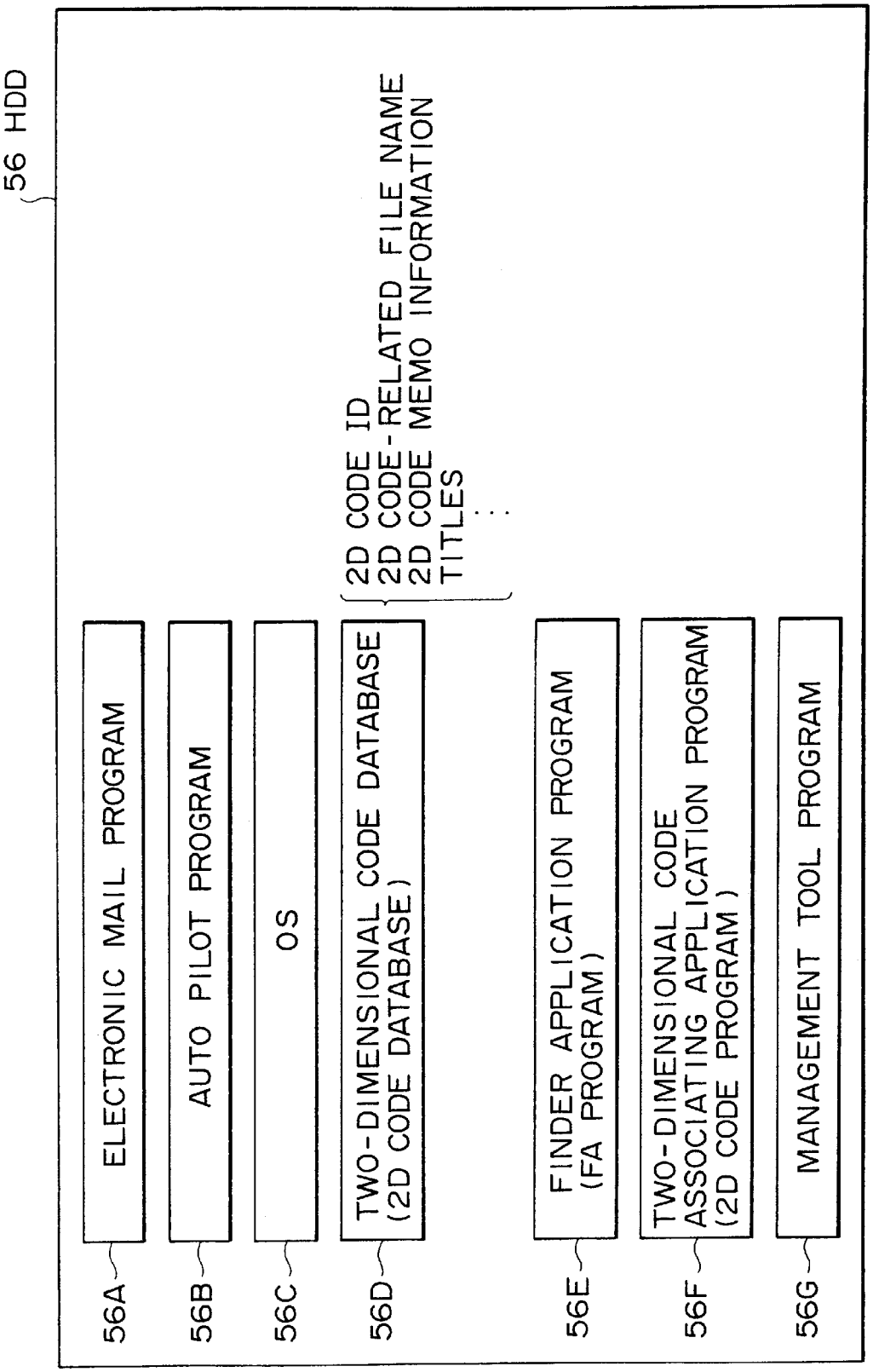
FIG. 10 is a schematic view indicating a structure of an HDD in FIG. 9.

As shown in FIG. 10, the hard disk drive (HDD) 56 connected to the external bus 55 contains the electronic mail program 56A, auto pilot program 56B, OS (operating system) 56C, a two-dimensional code database (called the 2D code database hereunder) 56D, a finder application program (called the FA program hereunder) 56E, a two-dimensional code associating application program (called the 2D code program hereunder) 56F, and a management tool program 56G.

The 2D code database 56D stores, besides ID numbers of two-dimensional codes (called code IDs hereunder), names of executable files (programs) having an extension ".exe" or ".com" each, or of document files such as those with extensions ".txt," ".htm," ".jpg," etc., established in connection with two-dimensional codes. An executable file is established so that it is automatically started when the corresponding two-dimensional code is recognized (that file is called a 2D code-related executable file hereunder) A document file is established so that it is automatically opened by a related executable file which in turn is automatically activated when the corresponding two-dimensional code is recognized (that file is called a 2D code-related document file hereunder) In the description that follows, 2D code-related executable files and 2D code-related document files may be collectively called 2D code-related files if there is no specific need to distinguish between the two types of files.

In addition, the 2D code database 56D stores information describing contents of 2D code-related files in-connection with code IDs (the information is called the 2D code memo information hereunder) Also contained in the database is information attached to two-dimensional codes such as titles of 2D code-related files. In practice, the 2D code database 56D is accessed by use of various program modules called a DLL (dynamic link library) stored beforehand on the HDD 56.

The FA program 56E illustratively carries out a two-dimensional code extracting process whereby image data representing a given two-dimensional code are extracted from the image data held in the VRAM 81A of the graphic chip 81, a launcher process (described later) causing a process corresponding to a 2D code-related file to be automatically performed, and a visual effect process (described later) facilitating the use of these processes by the user. The FA program 56E also has an API (application programming interface) that is used to exchange code IDs and other diverse data with a 2D code program 56F.

The 2D code program 56F is a 2D code-related executable file that may exchange data with the FA program 56E through the API of the latter.

The management tool program 56G is used to store data necessary for the execution of the FA program 56E and 2D code program 56F. The management tool program 56G has a suitable GUI (graphical user interface).

During the booting process, the OS 56C, auto pilot program 56B and electronic mail program 56A are transferred successively from the hard disk drive 56 to the RAM 54 and stored in the memory.

In this example, the 2D code database 56D is furnished on the HDD 56 of the personal computer 1. Alternatively, the 2D code database may be provided in a WWW (World Wide Web) server connected to the Internet 92 so that the database may be shared by users on the Internet.

Returning to FIG. 9, the I/O controller 57 has a microcontroller 61 equipped with an I/O interface 62. The microcontroller 61 is constituted by the I/O interface 62, a CPU 63, a RAM 64 and a ROM 69 which are interconnected. The RAM 64 includes a key input status register 65, an LED (light-emitting diode) control register 66, a set time register 67, and a register 68. The set time register 67 is used to start the operation of a start sequence controller 76 when a time preset by the user (i.e., starting condition) is reached. The register 68 holds a correspondence between a preset combination of operation keys (starting condition) on the one hand and an application program to be started on the other hand. When the user inputs the preset combination of operation keys, the corresponding application program (e.g., electronic mail program) is started.

When the fingertip-operated programmable power key (PPK) 9 is pushed, the key input status register 65 gets and retains an operation key flag. The LED control register 66 is used to control the illumination of the message lamp ML indicating that boot-up status of an application program (e.g., electronic mail program) which is held in the register 68. A desired time of day may be set to the set time register 67.

The microcontroller 61 is connected to a backup battery 74. The battery 74 allows contents of the registers 65, 66 and 67 to be retained when power to the body 2 is turned off.

The ROM 69 in the microcontroller 61 contains in advance a wake-up program 70, a key input monitoring program 71 and an LED control program 72. The ROM 69 is illustratively composed of an EEPROM (electrically erasable and programmable read only memory). The EEPROM is also called a flash memory. The microcontroller 61 is connected to an RTC (real-time clock) 75 that keeps the current time.

The wake-up program 70 in the ROM 69 is a program that checks to see if a preset time in the set time register 67 is reached on the basis of time-of-day data from the RTC 75. When the preset time is reached, the wake-up program 70 starts up a predetermined process (or program). The key input monitoring program 71 continuously monitors whether the PPK 9 is pushed by the user. The LED control program 72 controls the lighting of the message lamp ML.

Furthermore, the ROM 69 contains a BIOS (basic input/output system) 73. The BIOS is a software program that controls exchanges of data (input and output) between the OS or application software on the one hand and peripheral devices (e.g., display part, keyboard, hard disk drive) on the other hand.

The keyboard controller 58 connected to the external bus 55 controls input from the keyboard 4. The stick type pointing device controller 59 controls input from the stick type pointing device 5.

The sound chip 60 receives input from the microphone 24, and supplies sound signals to a built-in speaker 8.

The modem 50 permits connection to a communication network 92 such as the Internet and to the mail server 93 through a public telephone line 90 and an Internet service provider 91.

The power switch 40 is operated to turn on and off the power supply. A half-push switch 85 is activated when the shutter button 10 is half-pushed. A full-push switch 86 is turned on when the shutter button 10 is fully pushed. A reverse switch 87 is turned on when the image pickup part 22 is rotated by 180 degrees (i.e., when the CCD video camera 23 is rotated into a direction suitable for picking up an image on the opposite side of the LCD 21).

Figure 11:
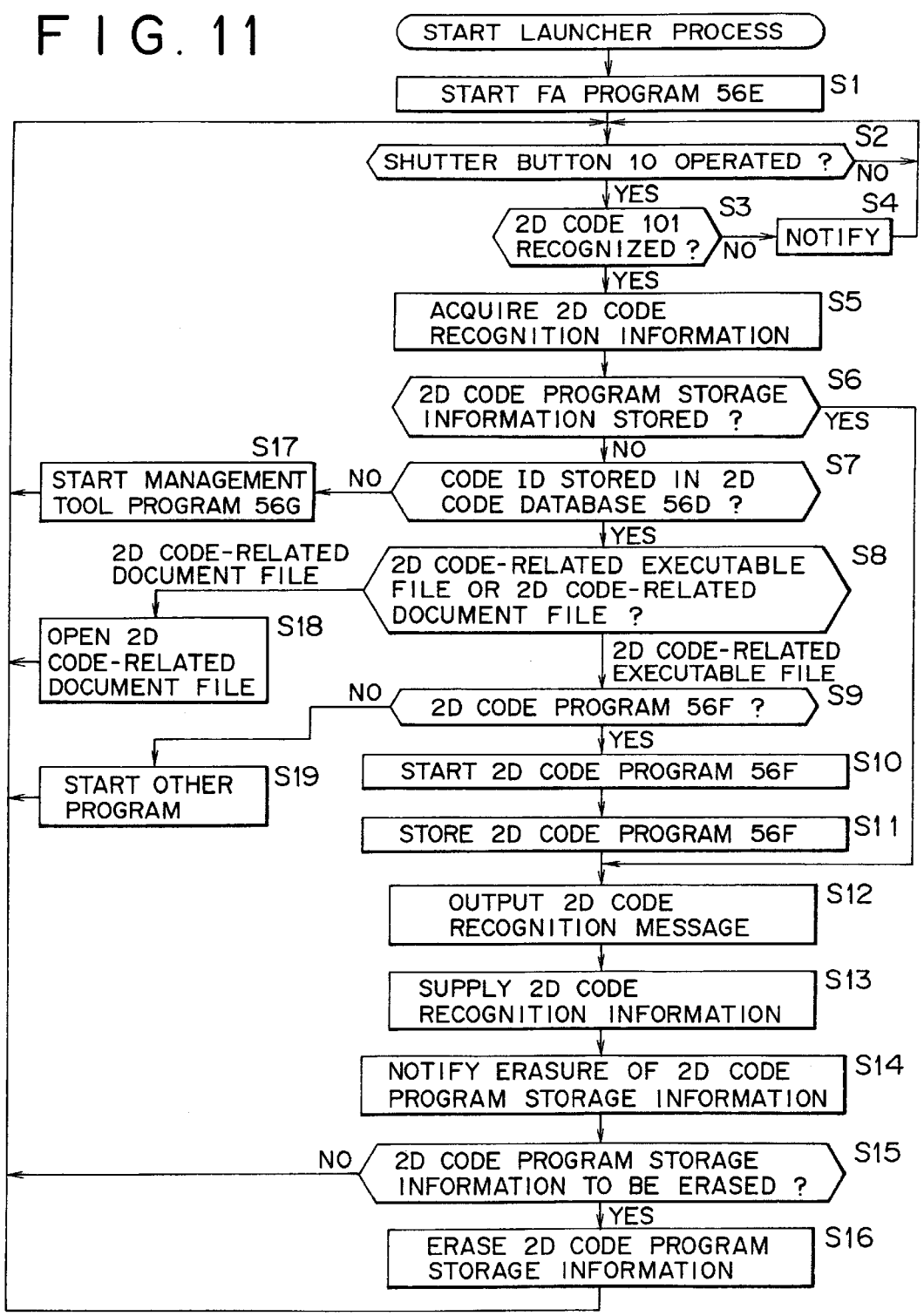
FIG. 11 is a flowchart of steps constituting a launcher process.

When the launcher process programmed in the FA program 56E is carried out, the CPU 52 performs steps constituting a flowchart in FIG. 11. The steps will now be described with reference to FIG. 11.

In step S1, the CPU 52 boots the FA program 56E stored on the HDD 56. In step S2, the CPU 52 waits for the shutter button 10 to be operated by the user. That is, the CPU 52 waits until the object 100 and the 2D code 101 attached thereto are picked up by the CCD video camera 23, the resulting image data processed by the processing part 82, and the processed image data rendered in the VRAM 81A of the graphic chip 81.

Illustratively, the user orientates that side of the object 100 which bears the 2D code 101 toward the CCD video camera 23, and operates the shutter button 10. This causes the CCD video camera 23 to capture image data about the 2D code 101, the captured image data being rendered in the VRAM 81A of the graphic chip 81. The image data are then displayed by the graphic chip 81 onto a finder screen 201 of the LCD 21 by means of the LCD controller 83 as shown in FIG. 12.

When the image data have been rendered in the VRAM 81A of the graphic chip 81 in step S2, step S3 is reached. In step S3, the CPU 52 extracts the image data about the 2D code 101 from the image data rendered in the VRAM 81A and checks to see if the 2D code is recognizable. If the 2D code 101 is successfully recognized, the CPU 52 goes to step S5. The recognition corroborates the presence of the two-dimensional code in the image data captured by the CCD video camera 23.

If the CPU 52 fails to recognize the 2D code 101 in step S3, step S4 is reached. In step S4, the CPU 52 causes the LCD controller 83 to display on the LCD 21 a message indicating the failed attempt to recognize the code, thus prompting the user to make another attempt. Step S4 is followed by step S2.

Figure 13:
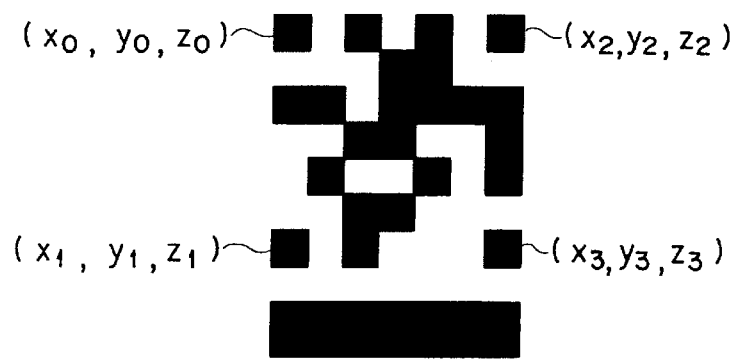
FIG. 13 is an explanatory view describing coordinate data representing a two-dimensional code.

In step S5, the CPU 52 acquires, from a cell pattern of the 2D code 101 recognized in step S3, a code ID and coordinates of displayed rectangular cells making up four corners of the two-dimensional code ((x0, y0, z0), (x1, y1, z1), (x2, y2, z2); called 2D code coordinate data hereunder) shown in FIG. 13. In the description that follows, the code ID and the 2D code coordinate data may be collectively called 2D code recognition information if there is no specific need to distinguish between the two.

In step S6, the CPU 52 checks to see if certain fields of the FA program 56E store the code ID acquired in step S5 and a window handle (window ID) of the corresponding 2D code program 56F. If no such ID information is found, step S7 is reached. In the description that follows, the code ID held in a certain field of the FA program 56E and the window handle of the corresponding 2D code program 56F may be collectively called 2D code program storage information.

In step S7, the CPU 52 checks the 2D code database 56D to see if the database contains the code ID acquired in step S5. If the code ID is found to be stored, step S8 is reached. In step S8, the CPU 52 searches the 2D code database 56D for the name of a 2D code-related file stored in correspondence with the code ID in question. A check is then made to see which file is set corresponding to the 2D code 101 in a 2D code-related executable file, or a 2D code-related document file.

In step S8, if the CPU 52 judges that a 2D code-related executable file is set with respect to the 2D code 101, step S9 is reached. In step S9, a check is made to see if the 2D code-related executable file is the 2D code program 56F.

In step S9, if the CPU 52 judges the 2D code-related executable file to be the 2D code program 56F, step S10 is reached. In step S10, the 2D code program 56F is started.

In step S11, the CPU 52 stores the window handle of the started 2D code program 56F into a suitable field of the FA program 56E in correspondence with the code ID acquired in step S5. This allows the 2D code program 56F to be written to the FA program 56E.

In step S12, the CPU 52 outputs a message to the window handle stored in the FA program 56E. The message in this case is a 2D code recognition message indicating that the two-dimensional code has been recognized, i.e., that 2D code recognition information about the 2D code 101 has been acquired. In this manner, the 2D code program 56F is notified of the 2D code recognition message.

In step S13, the CPU 52 supplies the 2D code program 56F, through the API, with the 2D code recognition information about the 2D code 101 acquired in step S5. In turn, the 2D code program 56F performs processing based on the 2D code recognition information (e.g., 2D code coordinate data about the 2D code 101).

With the processing of the 2D code program 56F ended, step S14 is reached. In step S14, the CPU 52 causes the LCD controller 83 to display a message prompting the user to delete the 2D code program storage information from a predetermined field of the FA program 56E. In response to the message, the user deletes the 2D code program storage information.

In step S15, the CPU 52 checks to see if a command is received from the keyboard controller 58 or stick type pointing device controller 59 designating erasure of the 2D code program storage information. If that command is found to be received, step S16 is reached. In step S16, the 2D code program storage information is deleted. Step S16 is followed by step S2. If the CPU 65 receives in step S15 a command indicating the user's willingness to forgo erasure of the 2D code program storage information, then step S16 is skipped and step S2 is reached.

If the 2D code program 56F is executed consecutively, the 2D code program storage information may be left stored in a predetermined field of the FA program 56E. This permits more efficient execution of the processing. Illustratively, suppose that in step S6, the 2D code program storage information is judged to exist in a certain field of the FA program 56E. In that case, steps S7 through S11 are skipped and step S12 is reached. Thereafter, the newly acquired 2D code recognition information is fed to the 2D code program 56F which in turn carries out an appropriate process.

If the CPU 52 judges in step S7 that the code ID acquired in step S5 is not contained in the 2D code database 56D, then step S17 is reached. In step S17, the CPU 52 starts up the management tool program 56G (described later) Step S17 is followed by step S2.

If the CPU 52 judges in step S8 that a 2D code-related document file is designated with regard to the code ID, step S18 is reached. In step S18, the 2D code-related document file is opened. Step S18 is followed by step S2.

If the CPU 52 judges in step S9 that an executable file other than the 2D code program 56F is designated as a 2D code-related executable file, step S19 is reached. In step S19, the executable file in question is started. Step S19 is followed by step S2. In this case, although the executable program is started up, unlike in the case of the 2D code program 56F, nothing is reported thereafter by the FA program 56F despite inputs made by the user.

When the 2D code 101 is recognized in the manner described above, the 2D code-related file established in connection with that code is automatically executed.

Figure 14:
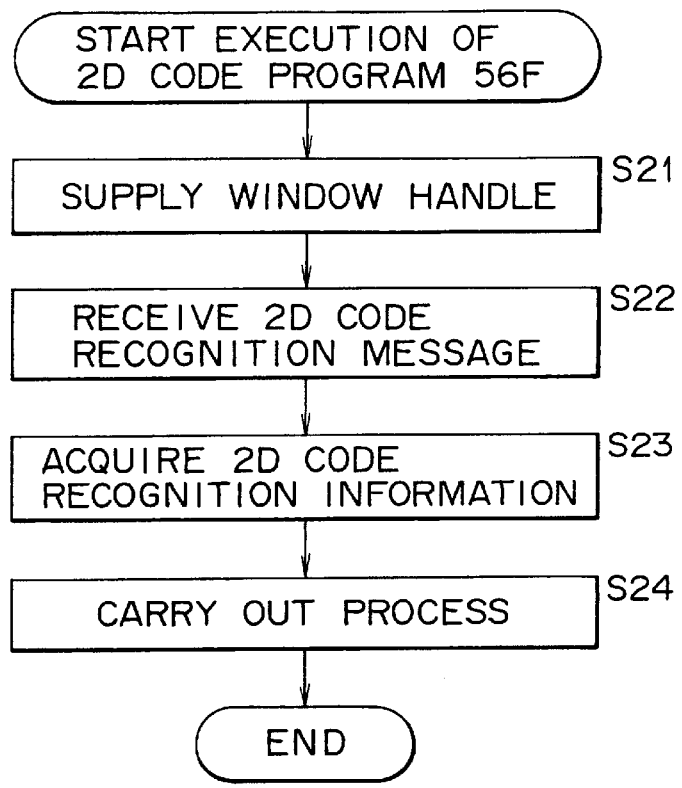
FIG. 14 is a flowchart of steps constituting a process of a 2D code program.

How the CPU 52 works in conjunction with the steps of the 2D code program 56F will now be described with reference to a flowchart of FIG. 14.

When the 2D code program 56F is started in step S10 of FIG. 11, the CPU 52 enters step S21. In step S21, the CPU 52 supplies the FA program 56E with that window handle of the 2D code program 56F which is held in the FA program 56E so that the window handle is stored in the FA program 56E (this step corresponds to step S11).

In step S22, the CPU 52 receives a 2D code recognition message from the FA program 56E (corresponding to step S12). In step S23, the CPU 52 acquires 2D code recognition information from the FA program 56E through the API (corresponding to step S13).

Figure 15:
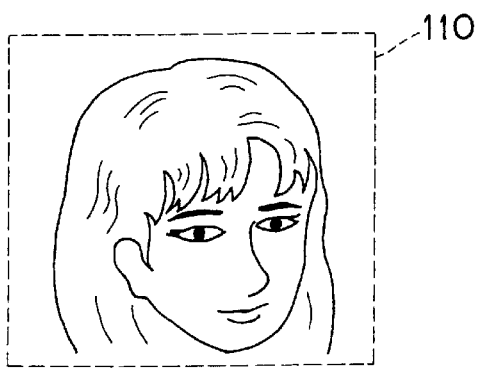
FIG. 15 is a view illustrating a typical image stored in a VRAM in FIG. 9.

In step S24, the CPU 52 carries out a suitable process based on the 2D code recognition information acquired in step S23. This example involves having a face image 110 in FIG. 15 superimposed onto, say, a blue rectangular background portion 120 (shaded) printed on the left hand side of the object 100 shown in FIG. 12. It is assumed here that motion image files such as an animation GIF file for displaying the face image 110 in FIG. 15 are stored beforehand on the HDD 56 or somewhere appropriate.

The CPU 52 thereupon calculates that position on the LCD 21 in which to display the face image 110 on the basis of the 2D code coordinate data about the 2D code 101, the data being derived from the 2D code recognition information on the 2D code 101 acquired in step S23. For example, the coordinates denoting four corners of the background portion 120 of the object 100 are obtained in correspondence with the 2D code coordinate data about the 2D code 101.

Figure 16:
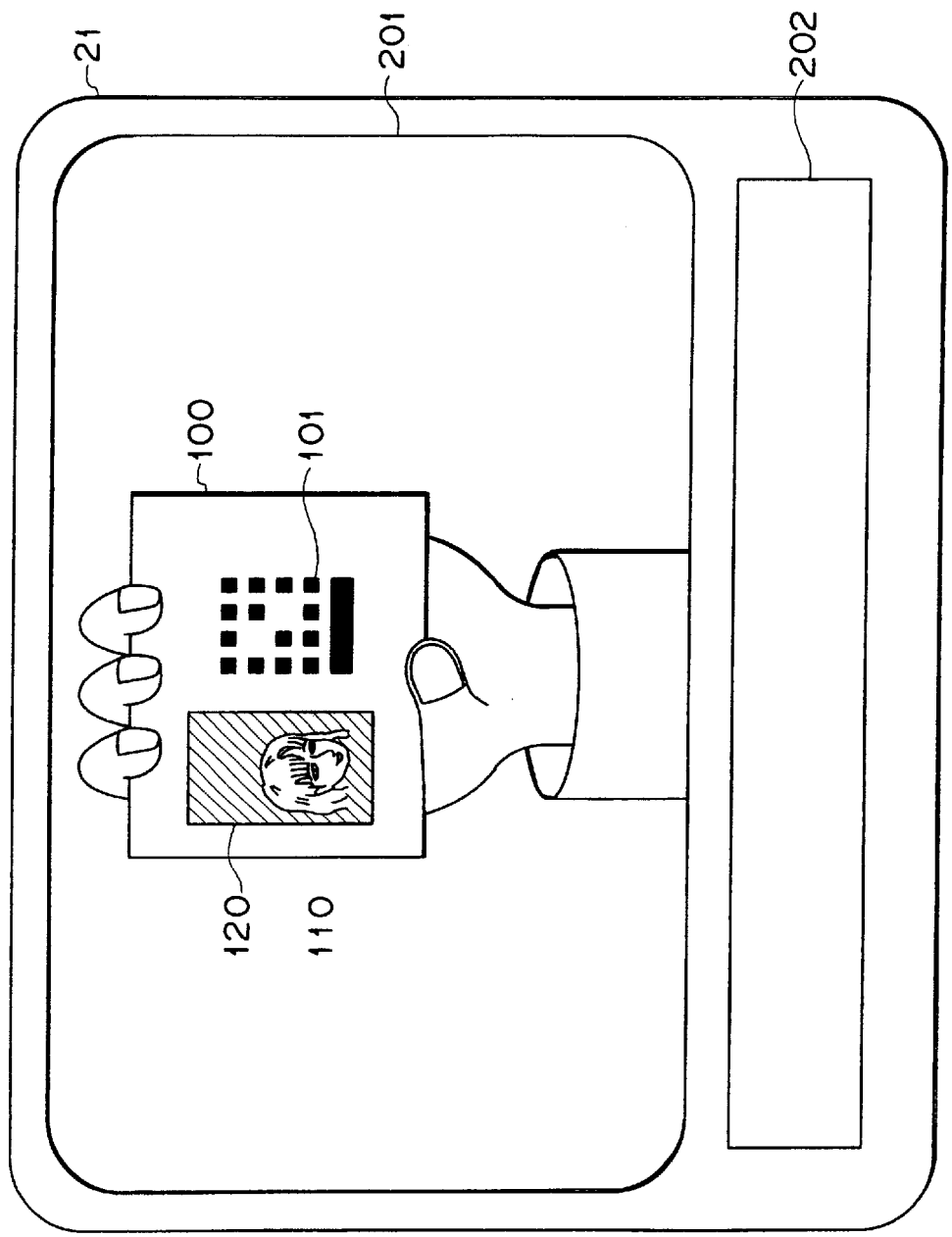
FIG. 16 is a schematic view of another display on the LCD in FIG. 3.

The CPU 52 reads from the HDD 56 the image file for displaying the face image 110 and, based on a calculated display position of the face image 110, formulates a composite image by rendering in the VRAM 81A the face image 110 together with images of the object 100 and 2D code 101. With the composition of the images finished, the graphic chip 81 causes the LCD controller 83 to display the image data rendered in the VRAM 81A onto the finder screen 201 of the LCD 21, as shown in FIG. 16.

It is possible to get the face image 110 displayed on the finder screen 201 of the LCD 21 in any one of several manners: as an animated picture based on animation GIF files or the like, as a high-quality motion image using MPEG files, or as a still image employing JPEG files. A motion image may be displayed in synchronism with a sound reproduced from a voice file corresponding to the image.

Figure 17:
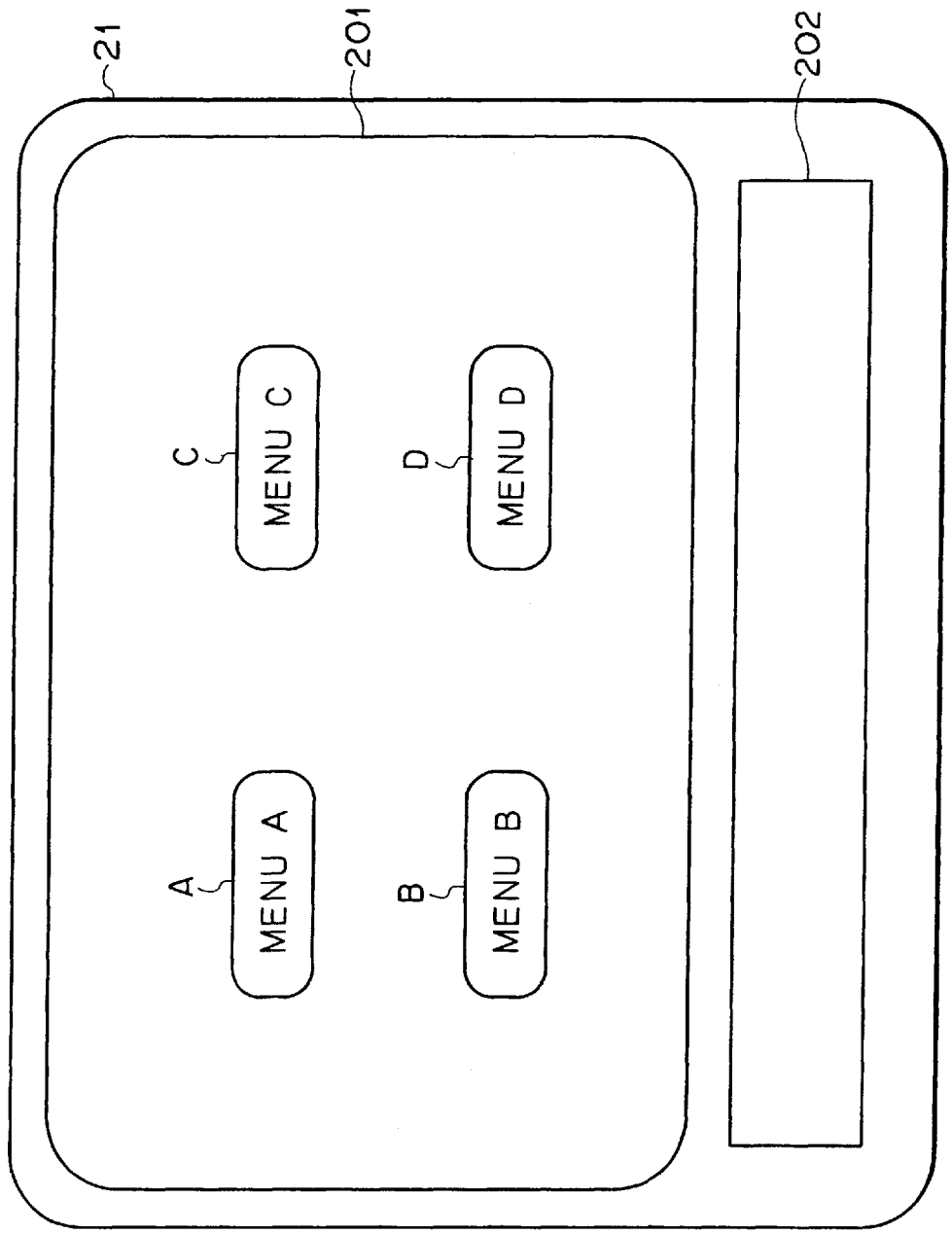
FIG. 17 is a schematic view of another display on the LCD in FIG. 3.

When the 2D code coordinate data acquired as 2D code recognition information, i.e., position information about the 2D code 101, is fed to the 2D code program 56F as described, the image composing process, among others, is made possible. That operating principle applies to another example: when, as shown in FIG. 17, four menu selection buttons A through D are displayed on the finder screen 201 of the LCD 21, a two-dimensional code may be brought into display in a position where a desired menu selection button is shown. This causes the desired menu selection button to be selected. In that manner, the user my can select any menu selection button without operating the keyboard 4 or stick type pointing device 5.

Figure 18:
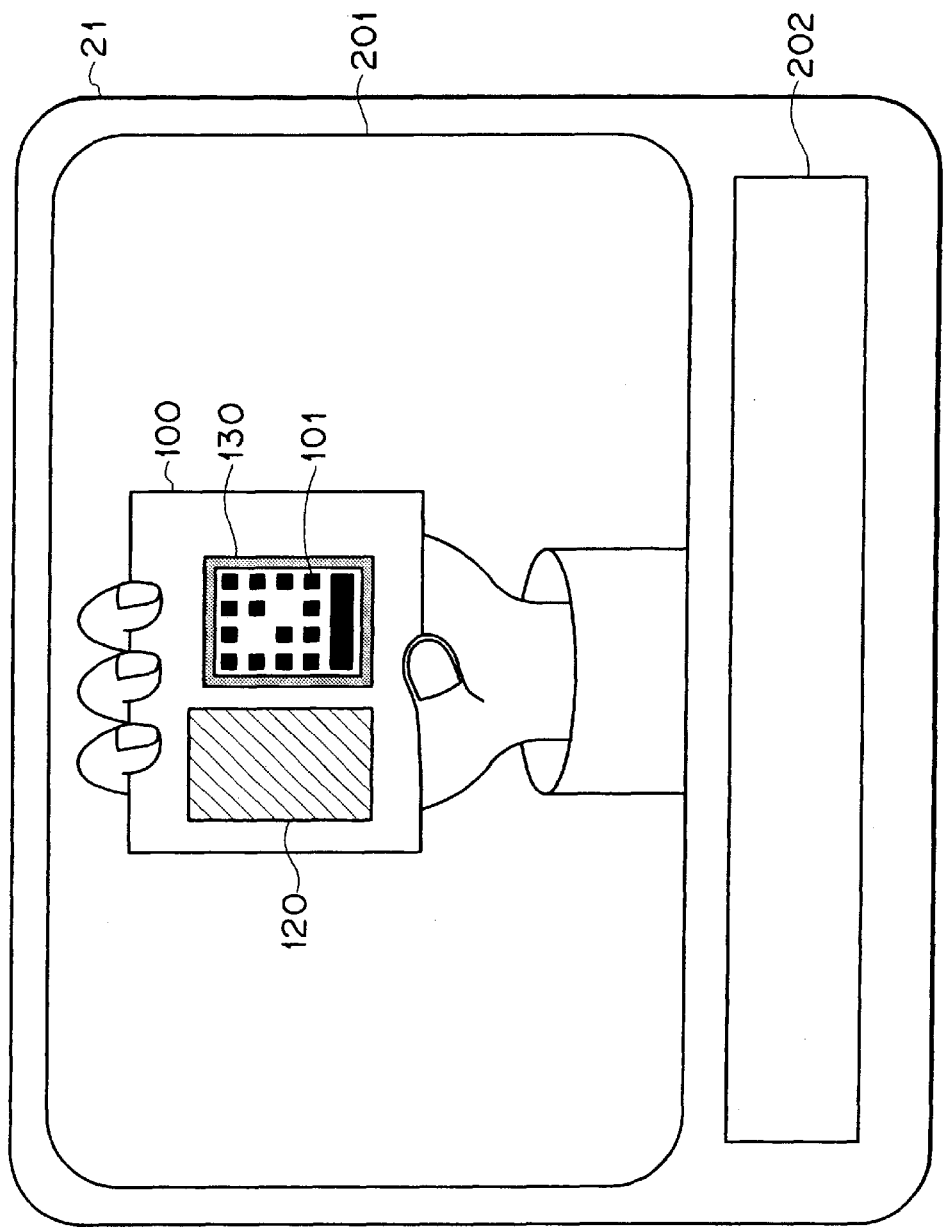
FIG. 18 is a schematic view of another display on the LCD in FIG. 3.
Figure 19:
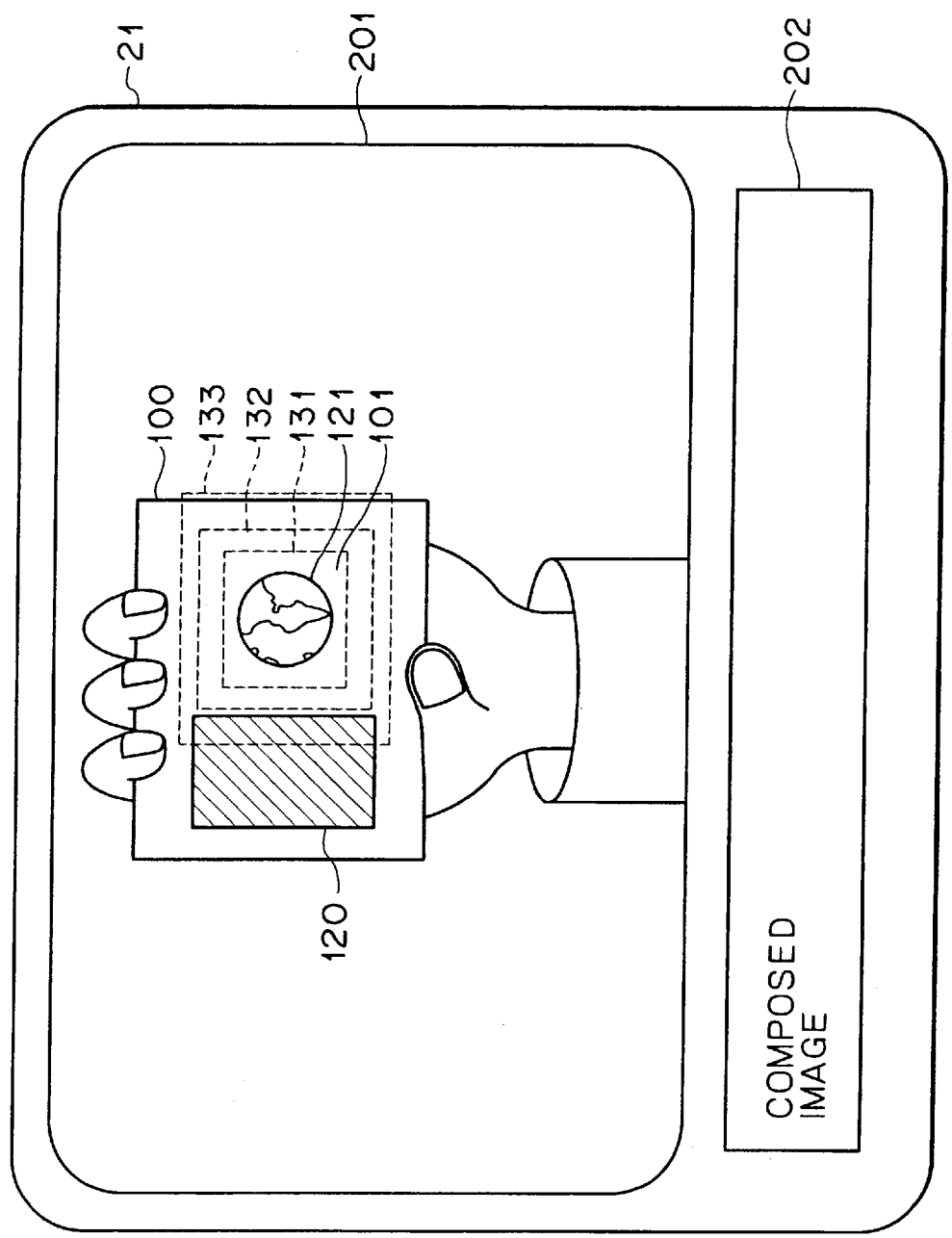
FIG. 19 is a schematic view of another display on the LCD in FIG. 3.

Described below with reference to FIGS. 18 and 19 are steps constituting a visual effect process. The process, programmed in the FA program 56E, is carried out during execution of the above-described 2D code program 56F (2D code-related executable file).

When the image of the 2D code 101 such as one shown in FIG. 12 is displayed on the finder screen 201 of the LCD 21, the CPU 52 detects 2D code recognition information about the recognized 2D code 101 (corresponding to step S5). On detecting the information, the CPU 52 causes the LCD controller 83 to put a frame around the displayed 2D code 101 on the finder screen 201. This allows the user to confirm with ease that the 2D code 101 has been recognized.

The CPU 52 searches the 2D code database 56D for a 2D code-related file name stored in correspondence with the code ID of the 2D code 101. When the 2D code-related file name is retrieved, the CPU 52 acquires a handle of a pictorial icon 121 designed to represent the content of the 2D code-related file. When the handle is acquired, the CPU 52 causes the LCD controller 83 to superimpose it onto the 2D code 101 as shown in FIG. 19. The CPU 52 further searches the 2D code database 56D for 2D code memo information stored in connection with the code ID. When the 2D code memo information is retrieved, the CPU 52 causes the LCD controller 83 to indicate the information in a suitable display portion 202 on the LCD 21 as shown in FIG. 19. The indication allows the user to know easily the content of the process performed by use of the 2D code-related file associated with the 2D code 101.

The image of the icon 121 appearing superposed on the 2D code 101 may illustratively be rotated like a miniature globe. Such a highlighted display provides easy confirmation of the current status by visually informing the user that the 2D code-related file has been successfully retrieved.

While the process corresponding to the 2D code-related file is being carried out, the CPU 52 causes the LCD controller 83 to expand gradually in four directions the frame 130 surrounding the 2D code 101, as indicated by broken-line frames 131, 132 and 133 in FIG. 19. The expanding display allows the user to verify easily that the process associated with the 2D code-related file is being executed.

Described below with reference to FIGS. 20 through 24 are other steps also constituting a visual effect process. This process, programmed in the PA program 56E, is carried out during execution of a process associated with a 2D code-related document file.

Figure 20:
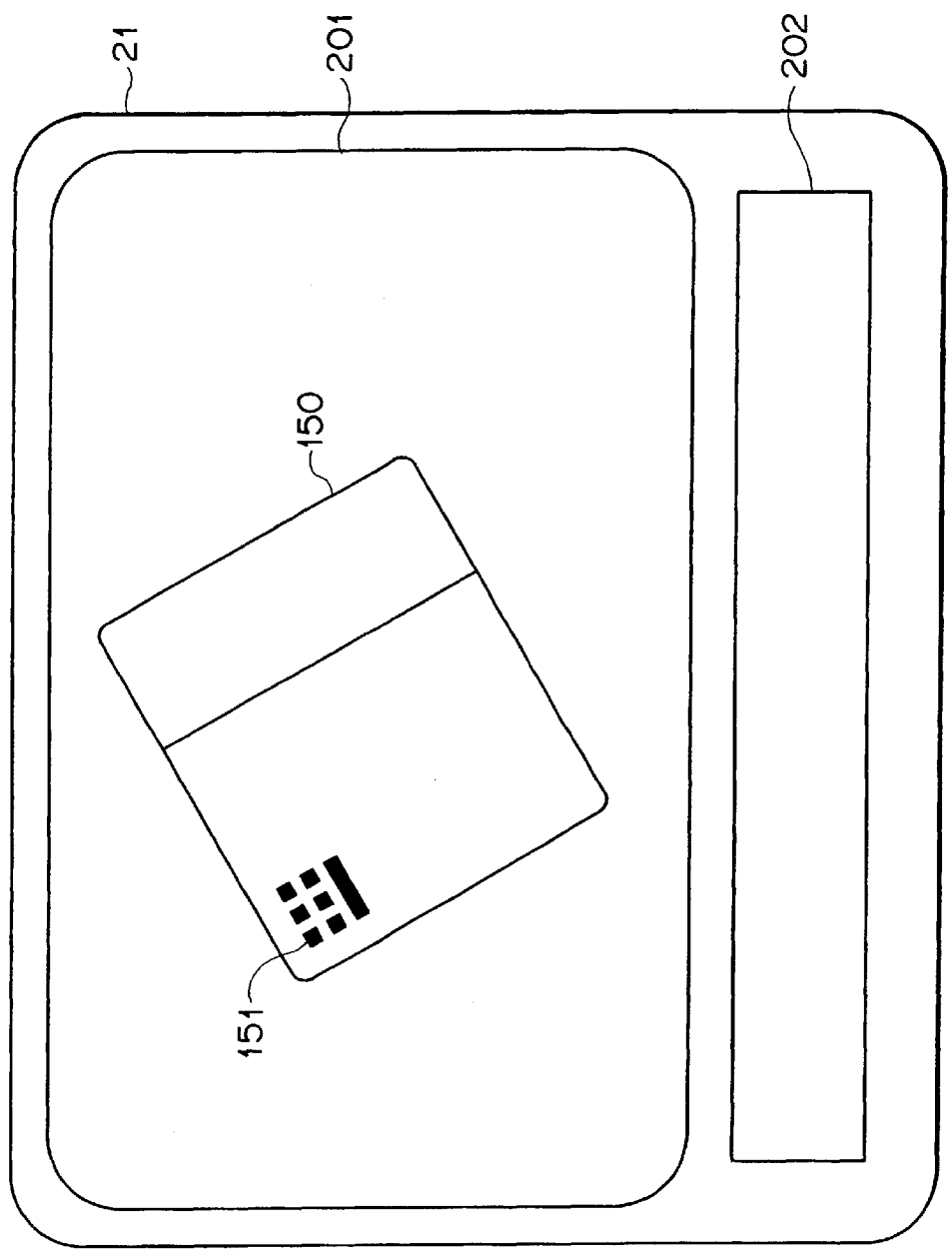
FIG. 20 is a schematic view of another display on the LCD in FIG. 3.
Figure 21:
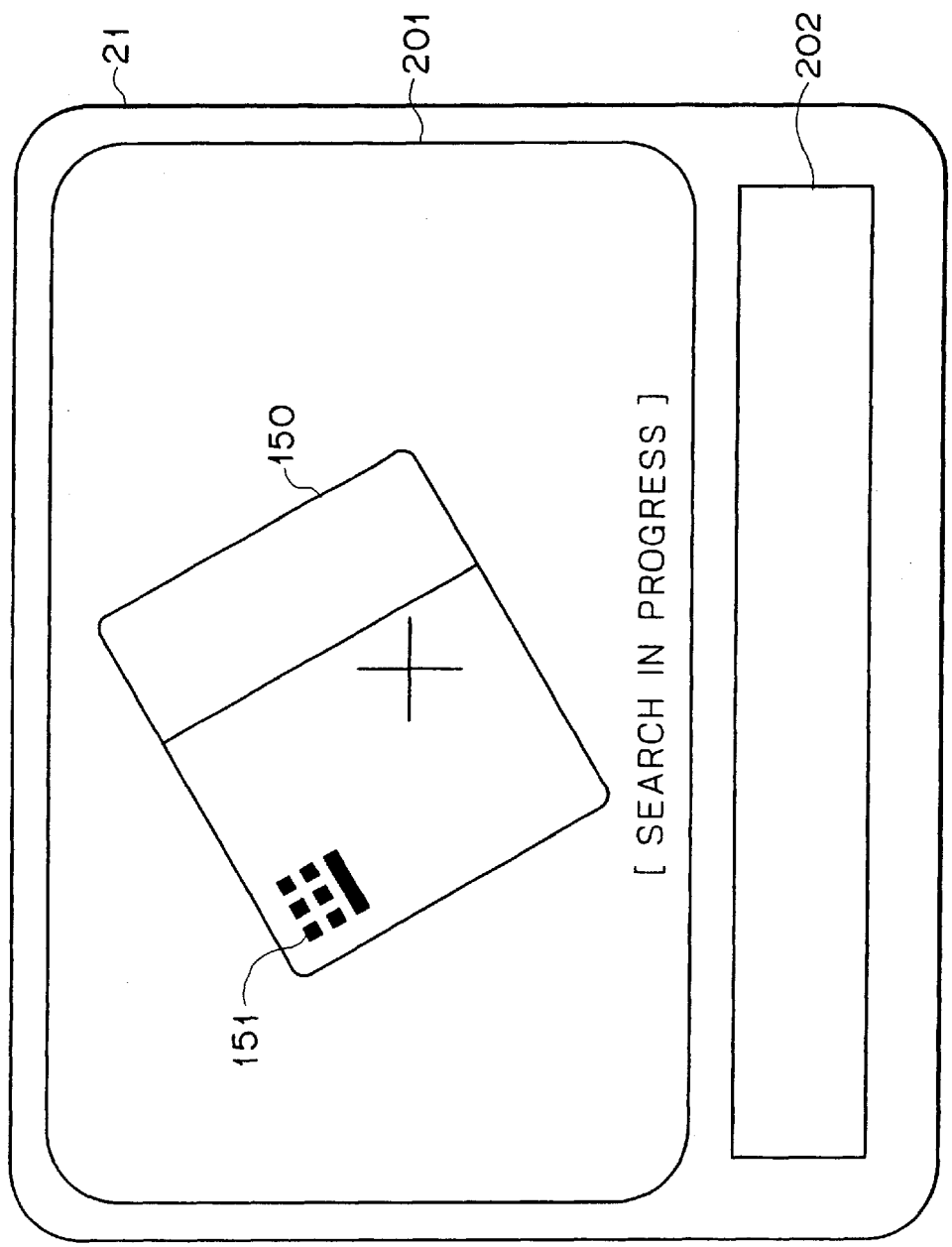
FIG. 21 is a schematic view of another display on the LCD in FIG. 3.

Suppose that an image of an MD (Mini Disc; registered trademark) 150 and a 2D code 151 representing an "ALBUM" file containing information about pieces of music recorded on the MD 150 are captured by the CCD video camera 23 and displayed on the finder screen 201 of the LCD 21 as shown in FIG. 20. In that case, the CPU 52 acquires 2D code recognition information about the recognized 2D code 151 (corresponding to step S5). The CPU 52 thereupon causes the LCD controller 83 to display a cross mark in the middle of the finder screen 201 and an indication "SEARCH IN PROGRESS" at the bottom of the finder screen 201 as depicted in FIG. 21. This allows the user to ascertain that the 2D code 151 has been recognized.

Figure 22:
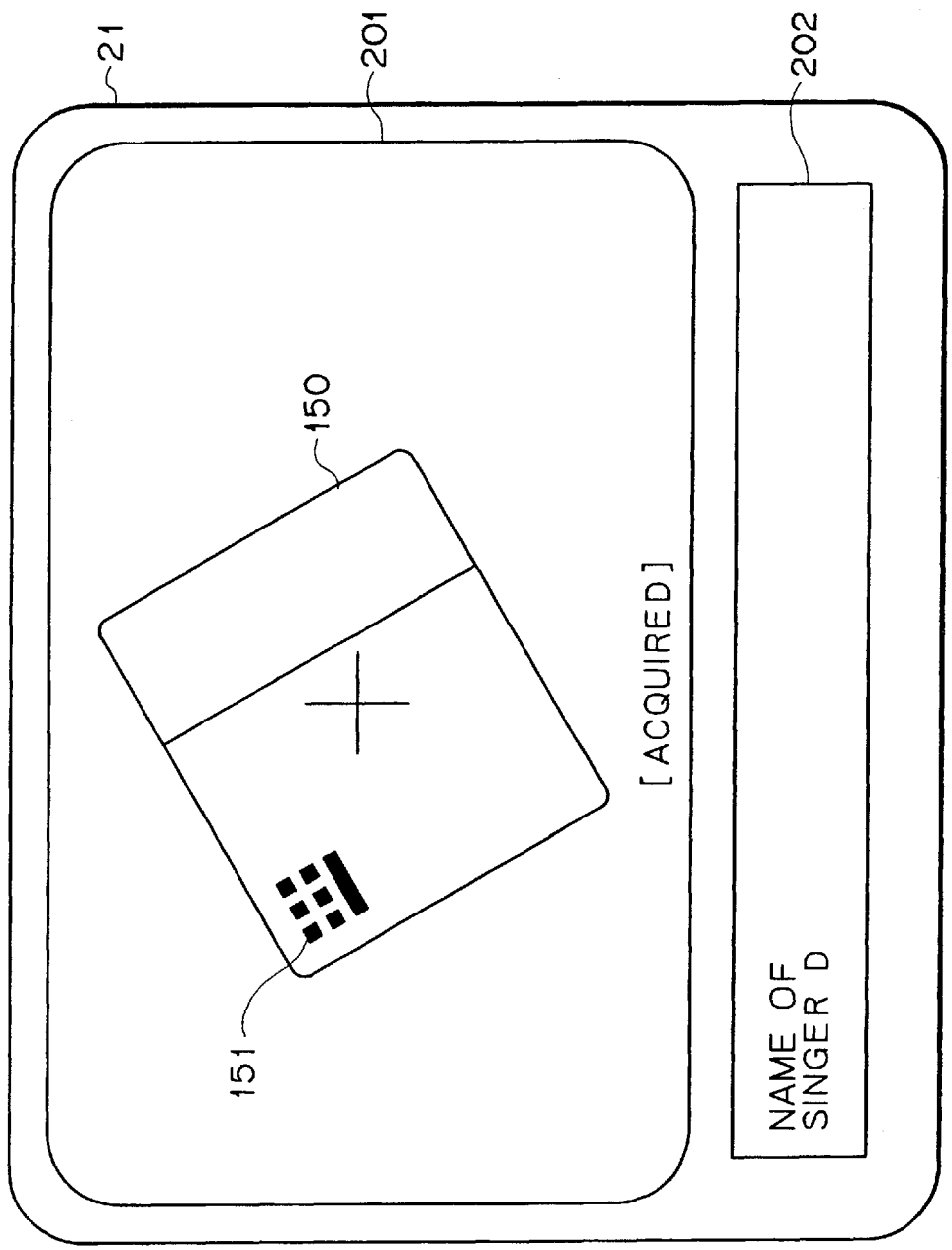
FIG. 22 is a schematic view of another display on the LCD in FIG. 3.
Figure 23:
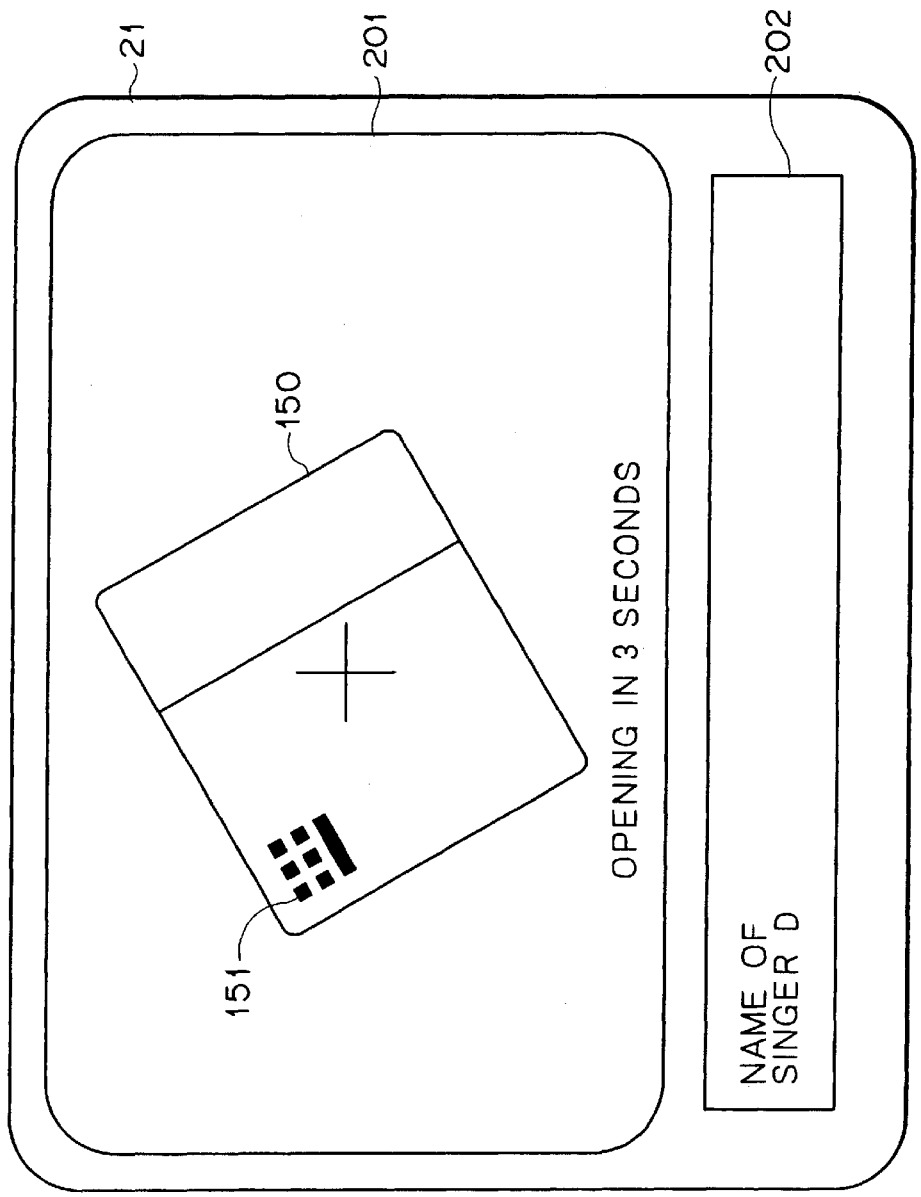
FIG. 23 is a schematic view of another display on the LCD in FIG. 3.

The CPU 52 searches the 2D code database 56D for 2D code memo information stored in correspondence with the code ID of the 2D code 151. When the 2D code memo information is retrieved, the CPu 52 causes the LCD controller 83 to display an indication "ACQUIRED" at the bottom of the finder screen 201 as shown in FIG. 22 along with the 2D code memo information in the display portion 202. In this example, the name of a singer D is shown in the display portion 202 as the 2D code memo information. The display allows the user to verify easily that the MD 150 contains songs by the singer D. Alternatively, a face image of the singer D may be displayed as the 2D code memo information.

Figure 24:
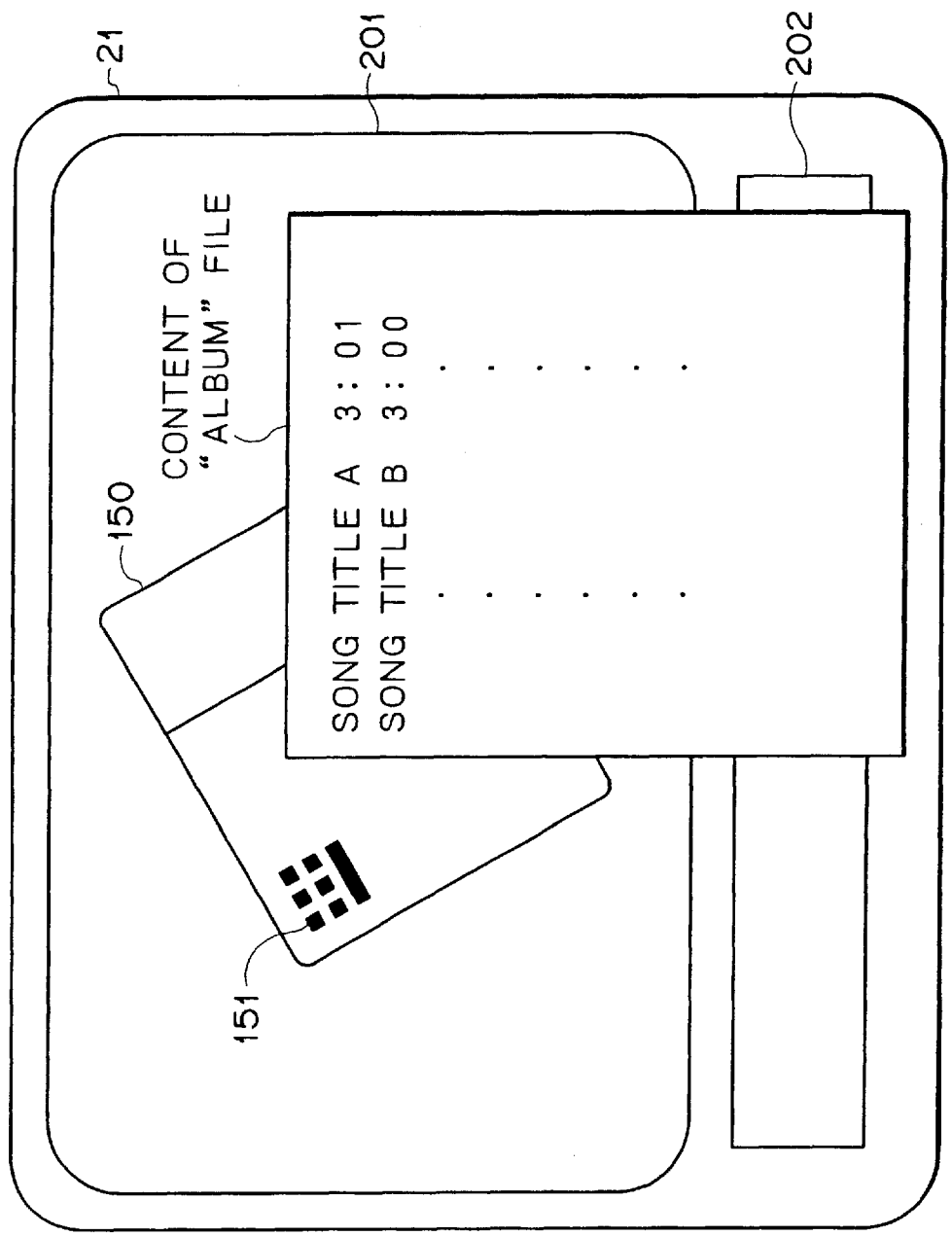
FIG. 24 is a schematic view of another display on the LCD in FIG. 3.

When starting to open the "ALBUM" file, i.e., a 2D code-related file set for the 2D code 105, the CPU 52 causes the LCD controller 83 to give an indication "OPENING" at the bottom of the finder screen 201 together with a time count indicating the time it takes to complete the opening process. With the "ALBUM" file thus opened, song titles, playing times and other information held in the "ALBUM" file are displayed as illustrated in FIG. 24.

Figure 25:
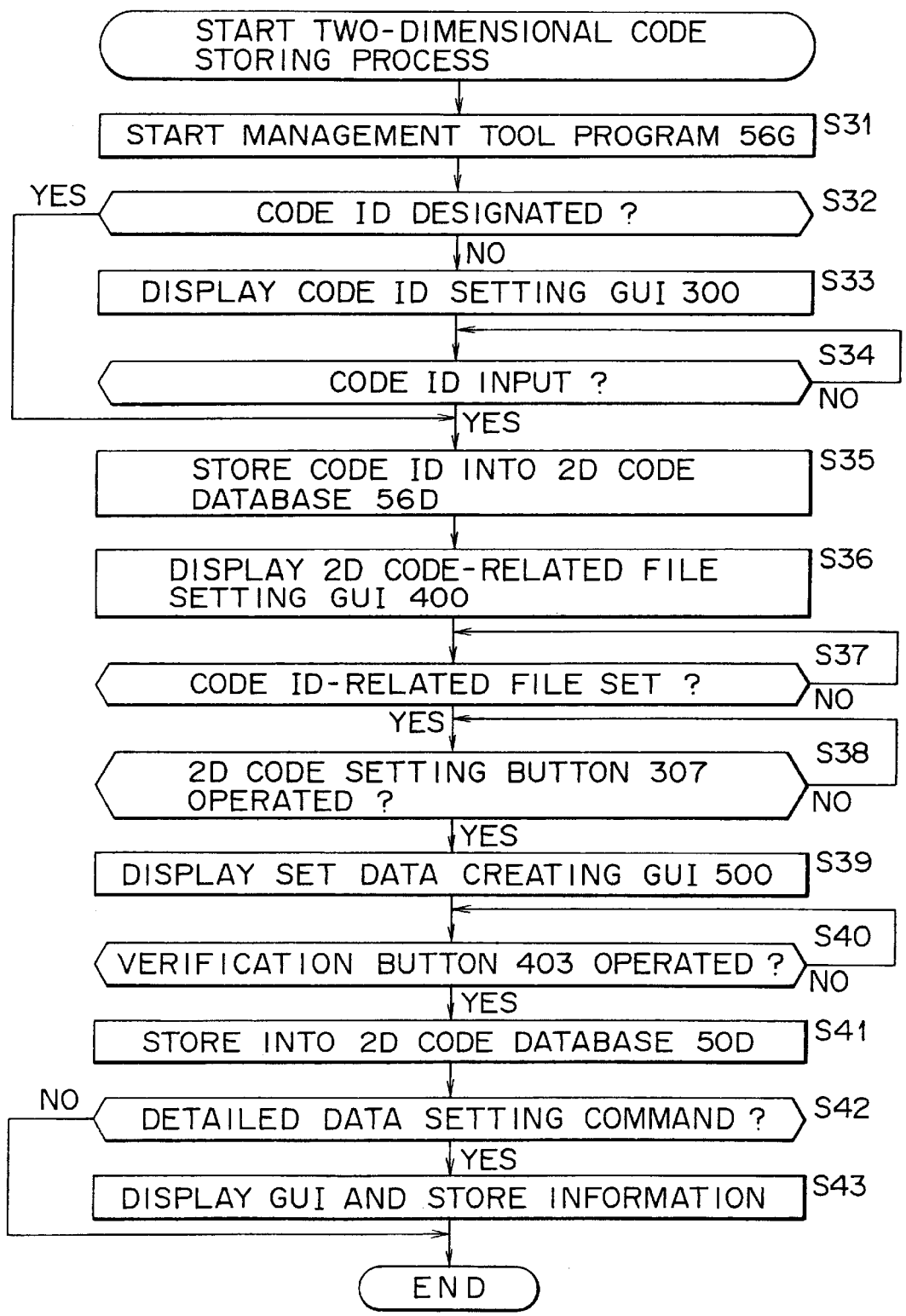
FIG. 25 is a flowchart of steps constituting a two-dimensional code storing process.
Figure 26:
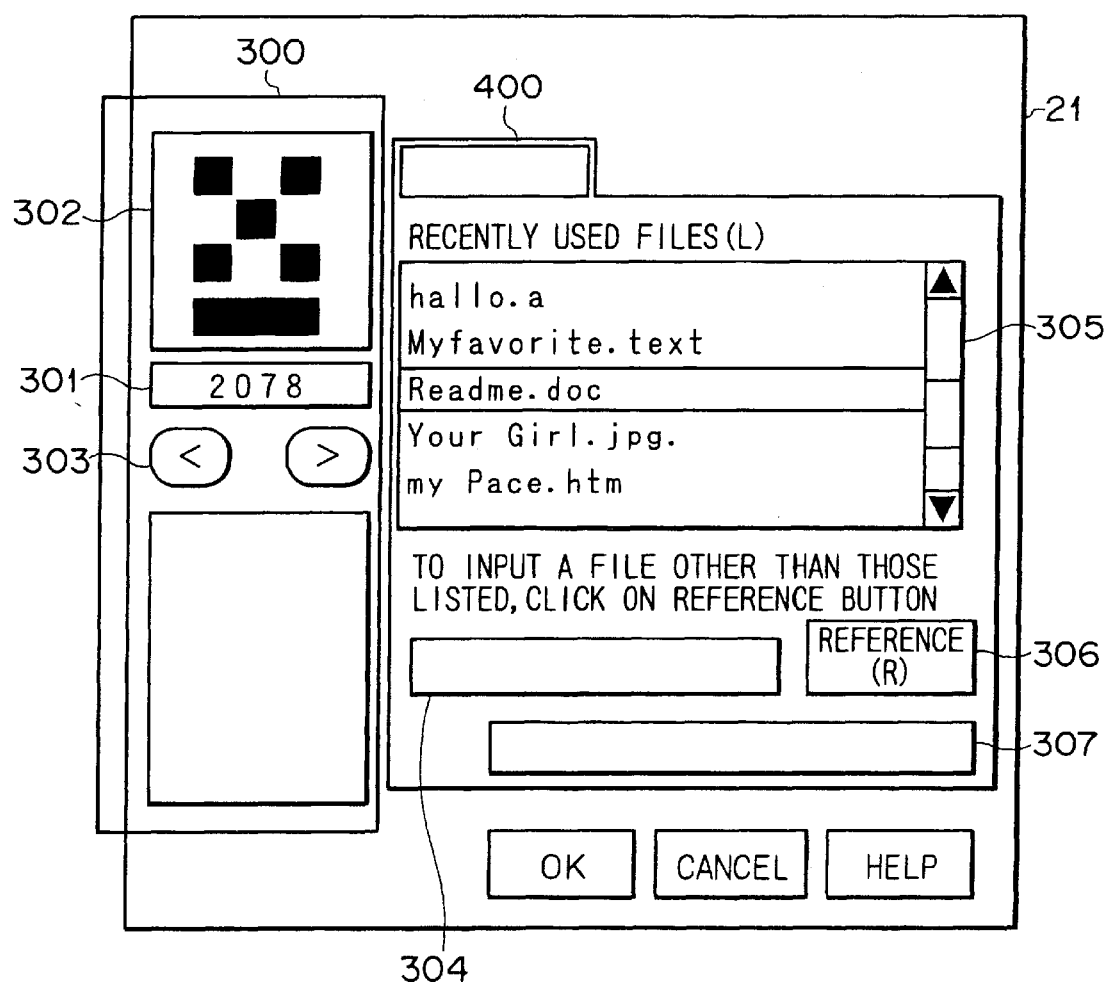
FIG. 26 is a schematic view of a typical GUI display provided by a management tool program.
Figure 27:
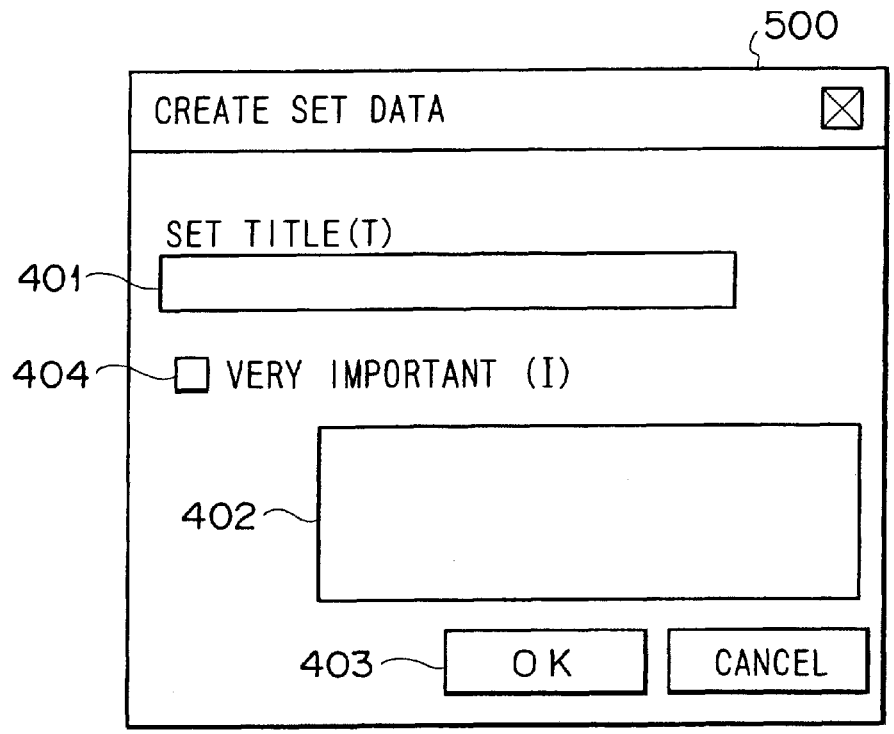
FIG. 27 is a schematic view of another GUI display provided by the management tool program.

How the CPU 52 works in conjunction with steps of the management tool program 56G will now be described with reference to a flowchart of FIG. 25. In this example, necessary data or commands are transmitted to the CPU 52 through a GUI corresponding to the management tool program 56G such as is shown in FIGS. 26 and 27.

The management tool program 56G is automatically started (in step S17) if the code ID of the recognized two-dimensional code is not found in the 2D code database 56D (step S7 in FIG. 11). Alternatively, the management tool program 56G is started by the user operating the keyboard 4 or stick type pointing device 5. In any case, the management tool program 56 is started in step S31. Step S31 is followed by step S32 in which a check is made to see if a code ID of the two-dimensional code to be stored is designated. If no such code ID is found designated, step S33 is reached.

In step S33, the CPU 52 causes the LCD controller 83 to display a code ID setting GUI 300 (FIG. 26) on the LCD 21. In step S34, the CPU 52 waits for a code ID input part 301 to receive a code ID of the two-dimensional code to be stored. The user enters the code ID either directly into the code ID input part 301 by operating the keyboard 4 or stick type pointing device 5, or indirectly by operating code ID feed buttons 303. When the code ID of the target two-dimensional code has been input by one of the above methods to the code ID input part 301, step S35 is reached. In step S35, the CPU 52 stores the input code ID into the 2D code database 56D on the HDD 56.

If, in step S32, the CPU 52 judges that the code ID of the two-dimensional code to be stored is designated, then step S35 is reached. Illustratively, when 2D code recognition information about the two-dimensional code is acquired in step S5 of FIG. 11, a cell pattern of the two-dimensional code is displayed in the 2D code display part 302, and the code ID is indicated in the code ID input part 301. In such a case, the CPU 52 judges that the code ID is designated and, goes to step S35.

In step S36, the CPU 52 causes the LCD controller 83 to display a 2D code-related file setting GUI 400 shown in FIG. 26. In step S37, the CPU 52 waits for an assigned file name input part 304 to receive a 2D code-related file name to be set in conjunction with the two-dimensional code to be stored. The user either selects a 2D code-related file from among the names of recently used 2D code-related files displayed in a display field 305, or chooses by operating a reference button 306 a 2D code-related file from other than the files indicated in the display field 305. When the 2D code-related file is selected by one of the above methods and the file name is input to the assigned file name input part 304, the CPU 52 goes to step S38.

In step S38, the CPU 52 waits for a 2D code setting button 307 to be operated on the 2D code-related file setting GUI 400. When the button 307 is operated, step S39 is reached. In step S39, the CPU 52 causes the LCD controller 83 to display a set data creating GUI 500 on the LCD 21 as shown in FIG. 27.

In step S40, the CPU 52 waits until the title of a 2D code-related file is input to a title input part 401 of the set data creating GUI 500, until 2D code memo information is input to a 2D code memo information input part 402, and until a verification button 403 is operated. When the title and the 2D code memo information are input and the verification button 403 is operated, step S41 is reached. In step S41, the CPU 52 stores into the 2D code database 56D the name of the 2D code-related file selected in step S37 as well as the information entered in step S40. The file name and the information are stored in correspondence with the code ID.

An importance affirmation button 404 on the set data creating GUI 500 is operated in order to prevent automatic erasure of a stored two-dimensional code 101.

Where the storage capacity of the 2D code database 56D is exhausted, efficient data management is implemented illustratively by automatically erasing the least-recently accessed two-dimensional codes 101 or the two-dimensional codes 101 retained past a predetermined effective date. In such cases, the importance affirmation button 404 is operated to designate a two-dimensional code 101 which, because of its importance, should not be automatically erased for data management purposes at a later date.

In step S42, the CPU 52 checks to see if a detailed data setting command is received from the keyboard controller 58 or stick type pointing device controller 59. If the command is found to be received, step S43 is reached. In step S43, the CPU 52 causes the LCD controller 83 to display an appropriate GUI on the LCD 21 and to store information input through the GUI into the 2D code database 56D in correspondence with the code ID. The process is then terminated. If the detailed data setting command is not found to be input in step S42, the CPU 52 skips step S43 and ends the processing.

In the manner described, the 2D code-related file is established in conjunction with the two-dimensional code.

The storing process by the management tool program 56G will now be described in more specific terms. Illustratively, suppose that a file named "TO TELEPHONE" describing a matter that the user wants to communicate to a friend H is created and retained as shown in FIG. 28.

Figure 29:
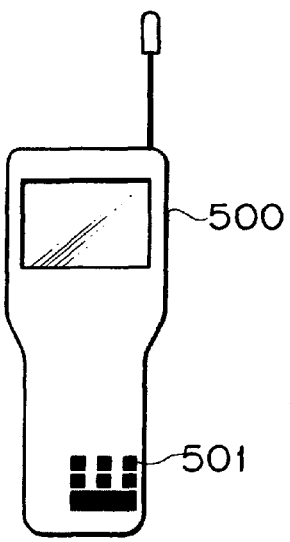
FIG. 29 is a schematic view of a portable telephone to which a two-dimensional code is attached.

The "TO TELEPHONE" file is then stored as a 2D code-related document file in connection with a 2D code 501 attached to a portable telephone 500 depicted in FIG. 29.

First, the CCD video camera 23 picks up an image of the 2D code 501. The CPU 52 recognizes the 2D code 501 (step S3) and acquires a code ID corresponding to the 2D code 501 (step S5). Then the CPU 52 judges that the acquired code ID is not stored in the 2D code database 56D (step S7), and starts the management tool program 56G accordingly (step S17).

The CPU 52 causes the LCD controller 83 to display on the LCD 21 both the 2D code-related file setting GUI 400 of FIG. 26 and the set data creating GUI 500 of FIG. 27. The user selects the previously stored "TO TELEPHONE" file by operating the keyboard 4 or stick type pointing device 5, and sets the file in conjunction with the 2D code 501.

Figure 30:
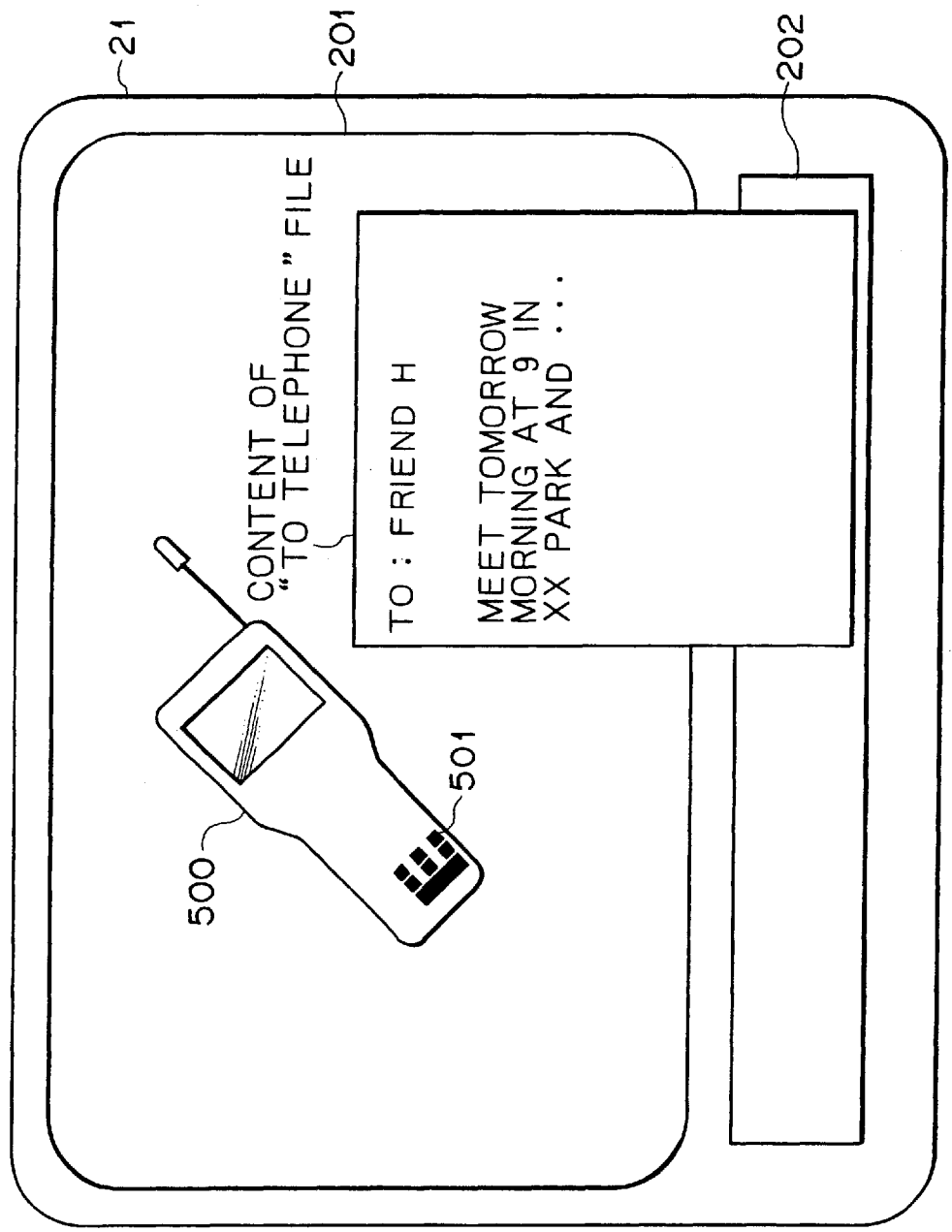
FIG. 30 is a schematic view of another display on the LCD in FIG. 3.

With the above settings completed, next time the user gets the CCD video camera 23 to capture the 2D code 501 on the portable telephone 500, the launcher process is carried out. As shown in FIG. 30, the "TO TELEPHONE" file is then opened automatically and its content displayed on the LCD 21. Checking the display, the user is reminded that the matter should be communicated to the friend H.

In the examples above, the invention was shown applied to two-dimensional codes. Alternatively, the invention may be applied to getting a user's V sign image 601 captured by the CCD video camera 23 and subjected to such image processing as edge extraction as shown in FIG. 31. When the user's predetermined sign or gesture is recognized as an image pattern like the one in FIG. 31, a specific program corresponding to that sign or gesture may be arranged to be executed.

A computer program designed to perform the above-described processes may be retained on such package media as floppy disks, CD-ROMs and DVDS; on semiconductor memories, magnetic disks and the like where the program is stored temporarily or permanently; on wired and wireless communication media such as local area networks, the Internet, and digital satellite broadcasting networks; or in diverse communication interfaces such as routers and modems for transmitting or receiving the program offered by the foregoing media. Such media, networks, interfaces and other measures allow the program to be installed in computers for program execution. The storage medium as mentioned in this specification refers broadly to all such media, networks, interfaces and measures.

As described and according to the inventive image processing apparatus, image processing method and storage medium above, identification information is first recognized from an acquired target image. A specific process corresponding to the acquired identification information is then activated selectively from among a plurality of previously stored processes. Thus, merely providing a target image automatically triggers execution of the process corresponding to that image.

As many apparently different embodiments of this invention may be made without departing from the spirit and scope thereof, it is to be understood that the invention is not limited to the specific embodiments thereof except as defined in the appended claims.

What is claimed is:

1. An image processing apparatus comprising:
   image acquiring means for acquiring a target image;
   identification information recognizing means for recognizing identification information corresponding to a specific image pattern from said target image acquired by said image acquiring means;
   activating means for activating selectively from among a plurality of previously stored processes a specific process corresponding to said identification information recognized by said identification information recognizing means so as to start execution of said specific process;

target image displaying means for displaying said target image acquired by said image acquiring means inside a specific display area;

position information detecting means for detecting position information about said specific image pattern relative to said target image acquired by said image acquiring means; and rendering means for rendering an image corresponding to said identification information recognized by said identification recognizing means, inside said specific display area and in a position corresponding to said position information detected by said position information detecting means.

2. An image processing apparatus according to claim 1, wherein said rendering means renders said image corresponding to said identification information recognized by said identification information recognizing means in a superposed manner onto said target image displayed by said target image displaying means inside said specific display area.

3. An image processing apparatus according to claim 1, wherein said rendering means renders an icon representing contents of said specific process which is activated by said activating means and which corresponds to said identification information, in a superposed manner onto said target image displayed inside said specific display area.

4. An image processing apparatus according to claim 1, wherein said rendering means renders an animation representing contents of said specific process which is activated by said activating means and which corresponds to said identification information, in a superposed manner onto said target image displayed inside said specific display area.

5. An image processing apparatus according to claim 1, wherein said rendering means renders an image obtained as a result of said specific process which is activated by said activating means and which corresponds to said identification information, inside said specific display area.

6. An image processing apparatus according to claim 1, wherein said rendering means renders a motion image obtained as a result of said specific process which is activated by said activating means and which corresponds to said identification information, inside said specific display area.

7. An image processing apparatus according to claim 1, further comprising execution content displaying means for displaying character information associated with said specific process which is activated by said activating means and which corresponds to said identification information.

8. An image processing apparatus according to claim 1, further comprising storing means for storing beforehand and in a desired manner said specific process which corresponds to said identification information recognized by said identification information recognizing means and which is activated by said activating means.

9. An image processing method comprising the steps of:

acquiring a target image;

recognizing identification information corresponding to a specific image pattern from the target image acquired in said image acquiring step;

activating selectively from among a plurality of previously stored processes a specific process corresponding to said identification information recognized in said identification information recognizing step so as to start execution of said specific process;

displaying said target image acquired in said image acquiring step inside a specific display area;

detecting position information about said specific image pattern relative to said target image acquired in said image acquiring step; and rendering an image corresponding to said identification information recognized in said identification recognizing step, inside said specific display area and in a position corresponding to said position information detected in said position information detecting step.

10. A storage medium for storing an image processing program executable by a computer and comprising the steps of:

acquiring a target image;

recognizing identification information corresponding to a specific image pattern from the target image acquired in said image acquiring step;

activating selectively from among a plurality of previously stored processes a specific process corresponding to said identification information recognized in said identification information recognizing step so as to start execution of said specific process;

displaying said target image acquired in said image acquiring step inside a specific display area;

detecting position information about said specific image pattern relative to said target image acquired in said image acquiring step; and rendering an image corresponding to said identification information recognized in said identification recognizing step, inside said specific display area and in a position corresponding to said position information detected in said position information detecting step.

* * * * *